United States Patent
Kim et al.

(10) Patent No.: US 11,699,300 B2
(45) Date of Patent: Jul. 11, 2023

(54) METHODS AND APPARATUSES FOR UPDATING USER AUTHENTICATION DATA

(71) Applicant: Samsung Electronics Co., Ltd., Suwon-si (KR)

(72) Inventors: Kyuhong Kim, Seoul (KR); Sungjoo Suh, Seoul (KR); Hyungsuk Kim, Seongnam-si (KR); Changkyu Choi, Seongnam-si (KR); Namjoon Kim, Anyang-si (KR); Wonjun Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 373 days.

(21) Appl. No.: 16/840,782

(22) Filed: Apr. 6, 2020

(65) Prior Publication Data

US 2020/0233944 A1  Jul. 23, 2020

Related U.S. Application Data

(62) Division of application No. 15/078,148, filed on Mar. 23, 2016, now Pat. No. 10,678,896.

(30) Foreign Application Priority Data

Jun. 30, 2015 (KR) .................... 10-2015-0093461
Nov. 2, 2015 (KR) .................... 10-2015-0152963

(51) Int. Cl.
*G06V 40/12* (2022.01)
*G06F 16/23* (2019.01)
(Continued)

(52) U.S. Cl.
CPC .......... *G06V 40/1335* (2022.01); *G06F 16/23* (2019.01); *G06F 16/51* (2019.01);
(Continued)

(58) Field of Classification Search
CPC .......... G06F 21/32; G06F 16/23; G06F 16/51; G06V 10/462; G06V 10/98; G06V 10/50;
(Continued)

(56) References Cited

U.S. PATENT DOCUMENTS 6,978,684 B2  12/2005  Nurse
7,593,961 B2  9/2009  Eguchi et al.
(Continued)

FOREIGN PATENT DOCUMENTS

CN  1886748  12/2006
CN  101231692  7/2008
(Continued)

OTHER PUBLICATIONS

Japanese Office Action and English translation thereof dated Mar. 24, 2020.
(Continued)

*Primary Examiner* — Catherine Thiaw
(74) *Attorney, Agent, or Firm* — Harness, Dickey & Pierce, P.L.C.

(57) ABSTRACT

A method for updating biometric authentication data authenticates an input image using an enrollment database (DB) over a first length of time, the authentication including generating information for authenticating the input image, and updates the enrollment DB based on the first length time and the information for authenticating the input image.

17 Claims, 26 Drawing Sheets

(51) Int. Cl.
*G06F 16/51* (2019.01)
*G06F 21/32* (2013.01)
*G06V 10/98* (2022.01)
*G06V 10/26* (2022.01)
*G06V 10/50* (2022.01)
*G06V 10/75* (2022.01)
*G06T 1/00* (2006.01)

(52) U.S. Cl.
CPC ............ *G06F 21/32* (2013.01); *G06T 1/0007* (2013.01); *G06V 10/26* (2022.01); *G06V 10/50* (2022.01); *G06V 10/7515* (2022.01); *G06V 10/98* (2022.01)

(58) Field of Classification Search
CPC ............... G06V 10/7515; G06V 10/26; G06V 40/1335; G06T 1/0007
See application file for complete search history.

(56) References Cited

U.S. PATENT DOCUMENTS

| | | | |
|---|---|---|---|
| 7,634,117 | B2 | 12/2009 | Cho |
| 7,720,262 | B2 | 5/2010 | Svedin |
| 8,275,178 | B2 | 9/2012 | Boshra |
| 8,308,665 | B2 | 11/2012 | Harry et al. |
| 8,350,671 | B2 | 1/2013 | Kim |
| 8,582,838 | B1 | 11/2013 | McCormick et al. |
| 9,135,792 | B2 | 9/2015 | Han et al. |
| 9,483,682 | B1 | 11/2016 | Chiang et al. |
| 2005/0238211 | A1 | 10/2005 | Du et al. |
| 2007/0159507 | A1 | 7/2007 | Urano |
| 2007/0294540 | A1* | 12/2007 | Wadayama ...... G06Q 20/40145 713/186 |
| 2008/0212846 | A1 | 9/2008 | Yamamoto et al. |
| 2008/0317290 | A1 | 12/2008 | Tazoe |
| 2009/0113209 | A1 | 4/2009 | Lee et al. |
| 2010/0061602 | A1 | 3/2010 | Yamada |
| 2010/0275258 | A1 | 10/2010 | Kamakura |
| 2011/0271554 | A1 | 11/2011 | Jazdanian |
| 2012/0013436 | A1 | 1/2012 | Niinuma |
| 2012/0186101 | A1 | 7/2012 | Sanchez |
| 2012/0188056 | A1 | 7/2012 | Sahin et al. |
| 2012/0222333 | A1 | 9/2012 | Short et al. |
| 2013/0055367 | A1 | 2/2013 | Kshirsagar et al. |
| 2013/0072835 | A1 | 3/2013 | Harry et al. |
| 2013/0272586 | A1* | 10/2013 | Russo ..................... G06V 40/50 382/124 |
| 2013/0279768 | A1 | 10/2013 | Boshra |
| 2013/0329967 | A1 | 12/2013 | Abiko |
| 2014/0003681 | A1 | 1/2014 | Wright et al. |
| 2014/0059673 | A1 | 2/2014 | Azar et al. |
| 2014/0133710 | A1 | 5/2014 | Hama |
| 2014/0142475 | A1 | 5/2014 | Goldfarb et al. |
| 2014/0188770 | A1* | 7/2014 | Agrafioti .............. A61B 5/7267 706/13 |
| 2014/0212010 | A1 | 7/2014 | Han et al. |
| 2014/0270420 | A1 | 9/2014 | Boshra |
| 2014/0316309 | A1 | 10/2014 | Seo et al. |
| 2014/0333415 | A1* | 11/2014 | Kursun ................. G06Q 30/00 340/5.83 |
| 2015/0016712 | A1* | 1/2015 | Rhoads ................ G06V 10/751 707/769 |
| 2015/0067822 | A1 | 3/2015 | Randall |
| 2015/0071506 | A1 | 3/2015 | Boshra et al. |
| 2015/0074615 | A1 | 3/2015 | Han et al. |
| 2015/0278584 | A1 | 10/2015 | Nakano et al. |
| 2015/0321339 | A1 | 11/2015 | Asbeck et al. |
| 2016/0012687 | A1 | 1/2016 | Obana et al. |
| 2016/0206503 | A1 | 7/2016 | Planke |
| 2016/0324487 | A1 | 11/2016 | Guo et al. |
| 2016/0366266 | A1 | 12/2016 | Chung et al. |
| 2017/0112712 | A1 | 4/2017 | Chawan et al. |
| 2017/0156662 | A1 | 6/2017 | Goodall et al. |
| 2018/0085281 | A1 | 3/2018 | Roh |
| 2018/0168913 | A1 | 6/2018 | Sedic |
| 2019/0122507 | A1 | 4/2019 | Roh |

FOREIGN PATENT DOCUMENTS

| | | |
|---|---|---|
| CN | 102968645 | 3/2013 |
| CN | 104050449 | 9/2014 |
| EP | 161260 A1 | 11/1985 |
| EP | 1671260 A1 | 6/2006 |
| EP | 2157531 A2 | 2/2010 |
| JP | S-62-019985 | 1/1987 |
| JP | 2004-157602 A | 6/2004 |
| JP | 2004-342073 A | 12/2004 |
| JP | 2007041925 A | 2/2007 |
| JP | 2009003564 A | 1/2009 |
| JP | 2010-061576 A | 3/2010 |
| JP | 2010061528 A | 3/2010 |
| JP | 2015-108952 A | 6/2015 |
| KR | 20080019833 A | 3/2008 |
| KR | 20100127432 A | 12/2010 |
| WO | WO-2005034021 A1 | 4/2005 |

OTHER PUBLICATIONS

European Office Action dated Aug. 23, 2017.
Roberto Brunelli and Tomaso Poggio "Face Recognition: Features versus Template", IEEE Transactions on pattern analysis and machine intelligence, vol. 15, No. 10, Oct. 1993, pp. 1042-1052 (Year: 1993).
Chinese Office Action and English translation thereof dated Mar. 25, 2021.
"Biometric template selection and update: a case study in fingerprints," Pattern Recognition, 2004.
Extended European Search Report dated Nov. 3, 2016.
Mansfield, A.J., "Best Practices in Testing and Reporting Performance of Biometrics Devices," Biometric Testing Best Practices, Version 2.01, Aug. 2002.
European Office Action dated Aug. 23, 2017.
Shelly et al. 'Microsoft Office Access 2007', excerpt, Chap 3, 2 pages (Year: 2008).
Scheidat et al. 'Automatic template update strategies for biometrics', 2007, 5 pages (Year: 2007).
Roberto Brunelli and Tomaso Poggio 'Face Recognition: Features versus Templates', IEEE Transactions on pattern analysis and machine intelligence, vol. 15, No. 10, Oct. 1993, pp. 1042-1052 (Year: 1993).

\* cited by examiner

FIG. 9
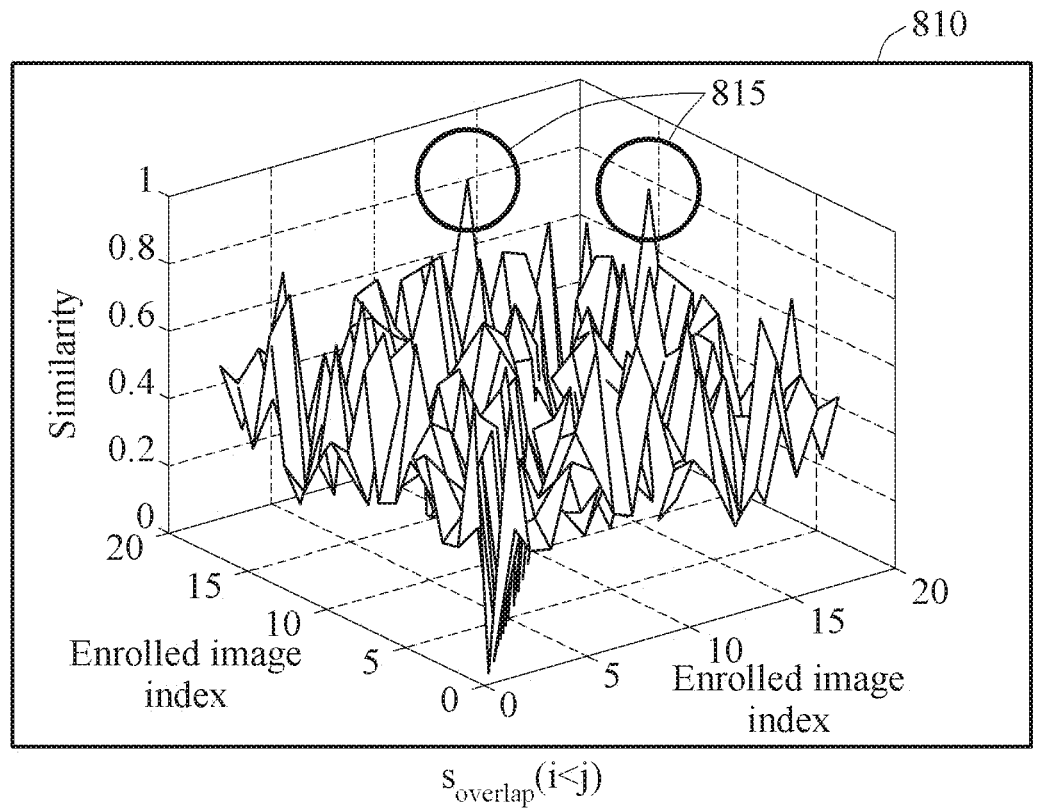
$s_{overlap}(i<j)$
1D Projection
$$s(j) = \sum_{i=1,\ i \neq j}^{M} s_{overlap}(i,j)$$

METHODS AND APPARATUSES FOR UPDATING USER AUTHENTICATION DATA

CROSS-REFERENCE TO RELATED APPLICATION(S)

This application is a divisional of and claims priority under 35 U.S.C. § 120/121 to U.S. application Ser. No. 15/078,148, filed Mar. 23, 2016, which claims the benefit under 35 U.S.C. § 119(a) of Korean Patent Application No. 10-2015-0093461, filed on Jun. 30, 2015, and Korean Patent Application No. 10-2015-0152963, filed on Nov. 2, 2015, in the Korean Intellectual Property Office, the entire disclosure of each of which are incorporated herein in its entirety by reference for all purposes.

BACKGROUND

1. Field

The following description relates methods and apparatuses for updating user authentication data.

2. Description of Related Art

Use of security authentication is increasing with the development of various mobile devices or wearable devices such as smart phones, for example. Authentication using biometric recognition authenticates a user using a fingerprint, an iris, a voice, a face, and blood vessels, for example. Biometric features used for authentication vary from person to person, do not cause any inconvenience of carrying, minimize risk of being stolen or imitated, and do not change during a lifetime.

In particular, fingerprint recognition is widely commercialized for many reasons such as convenience, security, and cost effectiveness. For example, fingerprint recognition enhances security for user devices and readily provides a variety of application services, for example, a mobile payment.

SUMMARY

This Summary is provided to introduce a selection of concepts in a simplified form that are further described below in the Detailed Description. This Summary is not intended to identify key features or essential features of the claimed subject matter.

In accordance with an example embodiment, there is provided a method for updating biometric authentication data in an enrollment database (DB), the method including authenticating an input image using an enrollment DB over a first length of time, the authenticating including generating information for authenticating the input image, and updating the enrollment DB based on the first length of time and the information for authenticating the input image.

The updating may include determining similarities based on sizes of overlap regions between the input image and enrolled images in the enrollment DB, and determining whether to enroll the input image in the enrollment DB based on the similarities.

The determining may include at least one of determining a portion of the similarities based on the information for authenticating the input image, and determining the portion of the similarities to be a minimum value based on the first length of time.

The deciding may include at least one of determining if a maximum similarity of the similarities is less than or equal to an upper threshold, and determining if the maximum similarity is greater than or equal to a lower threshold. The upper threshold may correspond to a maximum similarity based on an overlap area between the enrolled images.

The information for authenticating the input image at least one of correlations in overlap regions between the input image and enrolled images in the enrollment DB, and sizes of the overlap regions between the input image and the enrolled images.

The authenticating may include determining sizes of overlap regions between the input image and enrolled images in the enrollment DB, determining correlations in the overlap regions between the input image and the enrolled images, determining if the correlations are greater than or equal to a threshold, outputting an accept signal if the correlations are greater than or equal to the threshold, and storing the sizes of the overlap regions and the correlations in a memory, the stored sizes of the overlap regions and the correlations corresponding to the enrolled images. The authenticating may further include storing the first length of time in the memory.

The updating may include estimating a second length of time for updating the enrollment DB based on the first length of time, and adaptively updating the enrollment DB based on the second length of time. The estimating may include calculating the second length of time based on a difference between the first length of time and a third length of time, the third length of time being an allocated length of time for biometric authentication.

The updating may include at least one of adding the input image to the enrollment DB, and replacing one of enrolled images in the enrollment DB with the input image. The replacing may include selecting a replacement image based on similarities, the similarities based on sizes of overlap regions between the enrolled images.

In accordance with another example embodiment, there is provided a method for updating biometric authentication data in an enrollment database (DB), the method including receiving an input image including biometric information, determining a first maximum similarity based on sizes of overlap regions between the input image and enrolled images in the enrollment DB, determining if the first maximum similarity is below an upper threshold, the upper threshold based on sizes of overlap regions between the enrolled images, and enrolling the input image in an enrollment DB based on the determining if the first maximum similarity is below the upper threshold. The biometric information may include at least one of fingerprint information, blood vessel information, and iris information.

The determining the first maximum similarity may include determining similarities between the input image and the enrolled images based on sizes of overlap regions between the input image and the enrolled images, and determining the first maximum similarity, the first maximum similarity having a greatest value of the similarities.

The determining the similarities may include determining a correlation in an overlap region between the input image and one of the enrolled images, determining a size of the overlap region between the input image and the one enrolled image, and determining a first similarity of the similarities between the input image and the one enrolled image based on the correlation and the size of the overlap region.

The determining the similarities may include determining a normalized cross correlation (NCC) value based on a translation vector and an angle of rotation, the translation vector and the angle of rotation based on an image registration between the input image and one of the enrolled images, determining a sharing area ratio between the input image and the one enrolled image, and determining first a similarity of the similarities between the input image and the one enrolled image based on the NCC value and the sharing area ratio.

The method may further include selecting a replacement image from the enrolled images based on first similarities, the first similarities based on sizes of overlap regions between the enrolled images.

The selecting may include selecting candidate images to be replaced from the enrolled images based on the similarities, each of the candidate images associated with a portion of the first similarities, the portion including first similarities between the associated candidate image and the remaining enrolled image, accumulating each portion, and selecting a candidate image having a highest accumulated portion from the candidate images as the replacement image.

The enrolling may include updating the enrollment DB, the updating including replacing the replacement image with the input image in if the first maximum similarity is less than the upper threshold, and maintaining the replacement image in the enrollment DB the first maximum similarity is greater than the upper threshold. The upper threshold may include a second maximum similarity, the second maximum similarity based on the sizes of the overlap regions between the enrolled images.

The enrolling may include determining if the first maximum similarity exceeds a lower threshold, and enrolling the input image in the enrollment DB based on the determining if the first maximum similarity exceeds the lower threshold.

The enrolling the input image in the enrollment DB based on the determining if the first maximum similarity exceeds the lower threshold may include enrolling the input image in the enrollment DB if the first maximum similarity is greater than the lower threshold and less than the upper threshold.

The method may further include determining an authentication score between the input image and the enrolled images, and performing user authentication with respect to the input image based on the authentication score and an authentication threshold, the performing user authentication including generating similarities between the enrolled images and the input image. The determining the first maximum similarity includes determining the first maximum similarity based on the generated similarities.

In accordance with still another example embodiment, there is provided an enrollment DB updating apparatus including a memory configured to store an enrollment DB including enrolled images, and a processor configured to authenticate an input image using the enrollment DB, and update the enrollment DB adaptively based on a first length of time used for authenticating the input image and a result calculated for authenticating the input image.

In accordance with yet another example embodiment, there is provided an enrollment DB updating apparatus including a memory configured to store an enrollment DB including enrolled images, and a processor configured to determine a maximum similarity based on sizes of overlap regions between an input image and the enrolled images, and enroll the input image in the enrollment DB based on a result of comparing the maximum similarity to an upper threshold set based on sizes of overlap regions between the enrolled images.

In accordance with further another example embodiment, there is provided a DB managing method including receiving an input image including biometric information, authenticating the input image based on enrolled images in the DB, and updating the DB, the update including, deciding whether to add the input image to the DB, wherein the authenticating and the updating is performed in less than or equal to a set time.

A sum of a time used for the authenticating and a time used for the update operation of may be less than or equal to a preset and/or selected maximum time. The biometric information may be fingerprint information.

At least one example embodiment discloses a method for updating biometric authentication data in a database, the method including authenticating an input image including biometric information based on enrolled images in the database, determining a similarity associated with the input image and the enrolled images and updating the database based on the similarity, an upper threshold and a lower threshold, the upper threshold being higher than the lower threshold.

In an example embodiment, the authenticating, the determining and the updating are performed in a set length of time.

In an example embodiment, the authenticating authenticates the input image in a first length of time and the updating updates the database in a second length of time, the updating includes, adapting the second length of time to be a difference between the set length of time and the first length of time.

In an example embodiment, the updating includes replacing one of the enrolled images with the input image if the similarity is between the upper threshold and the lower threshold.

In an example embodiment, the upper threshold is associated with a maximum similarity and the lower threshold is associated with a minimum similarity.

Other features and aspects will be apparent from the following detailed description, the drawings, and the claims.

BRIEF DESCRIPTION OF THE DRAWINGS

Example embodiments will be more clearly understood from the following detailed description taken in conjunction with the accompanying drawings. FIGS. 1-25 represent non-limiting, example embodiments as described herein.

FIG. 1 is a diagram illustrating an example embodiment of acquiring an input image including biometric information.

FIG. 2 is a diagram illustrating an example embodiment of a recognition rate improved by updating an enrollment database (DB).

FIG. 3 is a flowchart illustrating an example embodiment of a method of updating an enrollment DB.

FIG. 4 is a flowchart illustrating an example embodiment of a method of calculating a similarity.

FIG. 5 is a diagram illustrating an example embodiment of a method of determining a maximum similarity.

FIG. 6 is a flowchart illustrating an example embodiment of a method of updating an enrollment DB.

FIG. 7 is a flowchart illustrating an example embodiment of a method of selecting a replacement image.

FIGS. 8 and 9 are diagrams illustrating example embodiments of a method of selecting a replacement image.

FIG. 10 is a flowchart illustrating an example embodiment of a method of updating an enrollment DB.

FIG. 11 is a diagram illustrating an example embodiment of a process of authenticating biometrics.

FIG. 12 is a diagram illustrating an example embodiment of adaptive update of an enrollment DB.

FIG. 13 is a flowchart illustrating an example embodiment of a method of adaptively updating an enrollment DB.

FIG. 14 is a block diagram illustrating an example embodiment of a multi-stage authenticator.

FIG. 15 is a diagram illustrating an example embodiment of a coarse search.

FIG. 16 is a diagram illustrating an example embodiment of a fine search.

FIGS. 17 through 22 are diagrams illustrating an example embodiment of an updating apparatus for adaptively updating an enrollment DB.

FIG. 23 is a flowchart illustrating an example embodiment of a method of adaptively updating an enrollment DB.

FIG. 24 is a block diagram illustrating an example embodiment of an updating apparatus for updating an enrollment DB.

FIG. 25 is a diagram illustrating an example embodiment of a method of recognizing a blood vessel pattern.

Figure 1:
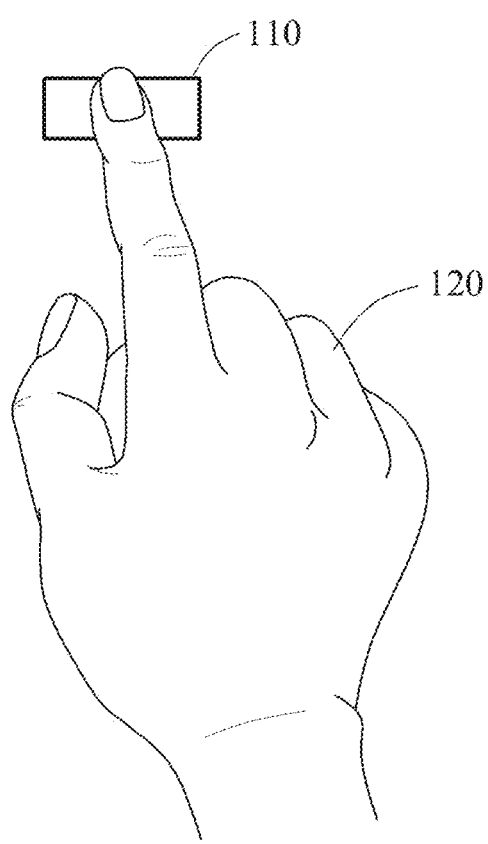

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Specific structural or functional descriptions are provided in the present disclosure to describe example embodiments. Example embodiments may be modified and implemented in various forms, and the scope of example embodiments is not limited to the descriptions provided in the present specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments set forth hereinafter use an input image including biometric information to perform a recognition operation and additionally to update an enrollment database (DB). For example, a fingerprint recognizer, a blood vessel recognizer, and an iris recognizer may authenticate or identify a user by performing the recognition operation, and update the existing enrollment DB based on authenticated or identified biometric information.

Example embodiments may be implemented in various types of products, for example, personal computers, laptop computers, tablet computers, smart phones, televisions, smart home appliances, intelligent vehicles, kiosks, and wearable devices. For example, example embodiments may be applied to processing of an image to authenticate a user using a smart phone, a mobile device, and/or a smart home system. In the same manner, example embodiments may be applied to an intelligent vehicle system, and a payment service through user authentication. Example embodiments may provide a robust user authentication result despite a relatively small finger of a user or an incorrect fingerprint input in the aforementioned scenarios. Hereinafter, reference will now be made in detail to example embodiments with reference to the accompanying drawings, wherein like reference numerals refer to like elements throughout.

Technique for Updating Enrollment Database Using Similarity Calculated Based on Size of Overlap Region FIG. 1 is a diagram illustrating an example of acquiring an input image including biometric information. Hereinafter, for ease of description, it is assumed that biometric information corresponds to a fingerprint. However, example embodiments may identically apply to a variety of biometric information recognizable in a form of an image, for example, blood vessels and an iris.

Referring to FIG. 1, a sensor 110 senses a fingerprint of a user. For example, the sensor 110 includes a plurality of sensing elements. The sensing elements are disposed in a structure of an array or a matrix. The sensor 110 senses a fingerprint input in a form of an analog signal using the plurality of sensing elements. The sensor 110 converts the sensed analog signal into a digital image using an analog-to-digital converter (ADC). Hereinafter, an input image may refer to a converted digital image.

A size of the sensor 110 may differ from a size of a finger 120 of the user. For example, when the sensor 110 is provided in a mobile device, the sensor 110 may be smaller than the finger 120 of the user to meet structural constraints of the mobile device. In this example, the sensor 110 may sense a portion of the fingerprint of the user. Hereinafter, an input image sensed by the sensor 110 may be a partial image of a user fingerprint.

Manufacturers may manufacture the sensor 110 by different sensor standards. The sensor standards include a size of a sensor array and a resolution of a sensor. The size of the sensor array indicates a size of a sensing region formed by a plurality of sensing elements. For example, the size of the sensor array may be 1 cm (width)×3 cm (length). The resolution of the sensor indicates a number of sensing elements per a unit length or a unit area.

Example embodiments provide methods and apparatuses for updating an enrollment DB. The enrollment DB includes enrolled images. The enrolled images correspond to partial images of a fingerprint of an enrolled user. Updating the enrollment DB includes, for example, adding new images to the enrollment DB, replacing a portion of the enrolled images included in the enrollment DB with a new image, or deleting a portion of the enrolled images included in the enrollment DB. The enrollment DB may also be referred to as a template.

Figure 2:
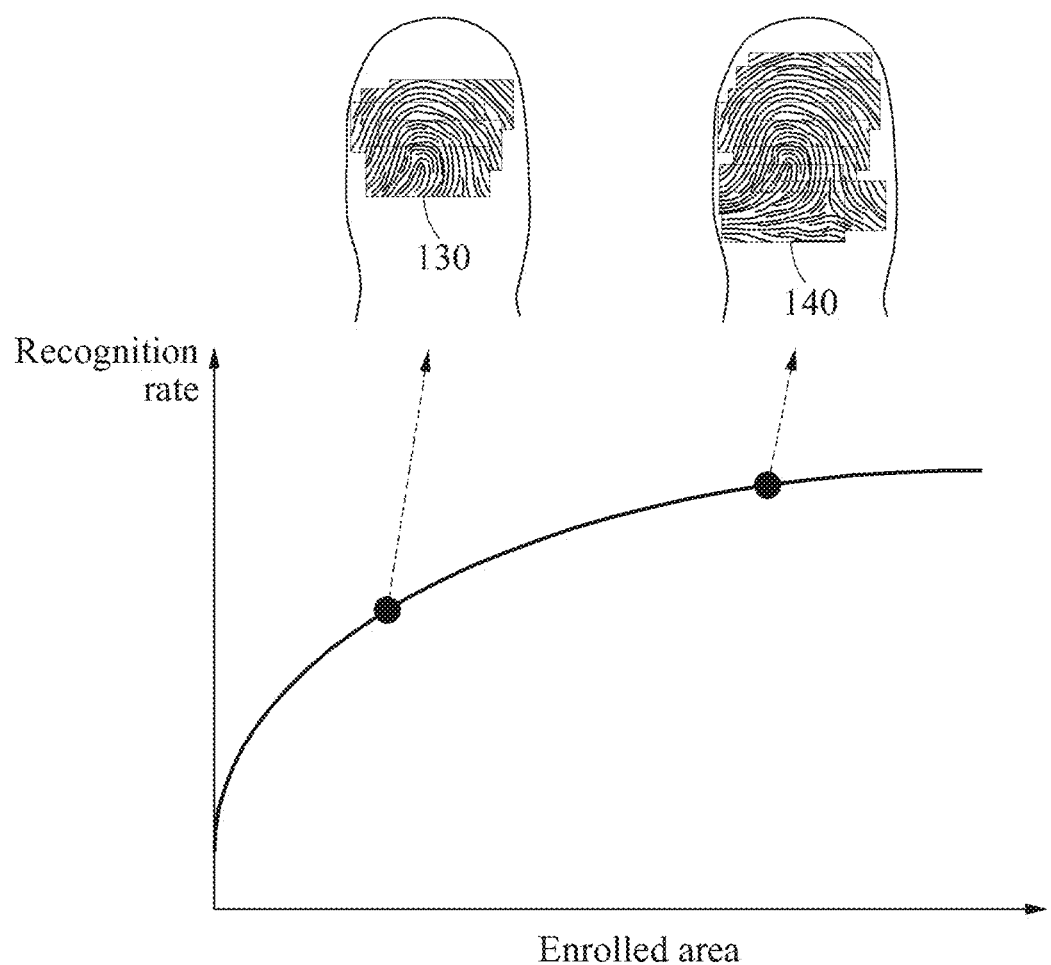

Referring to FIG. 2, a recognition rate increases in proportion to an enrolled area. The enrolled area refers to a size of a fingerprint region of a user covered by enrolled images included in an enrollment DB. For example, when the enrolled images included in the enrollment DB cover a first enrolled area 130, the recognition rate is 93%. When the enrolled images included in the enrollment DB cover a second enrolled area 140, the recognition rate is 99%.

Example embodiments update the enrollment DB to increase the enrolled area. For example, the enrolled images included in the enrollment DB at a first point in time correspond to the first enrolled area 130. The first point in time may be a point in time at which the user initially enrolls a fingerprint to use an electronic device to which examples are applied.

The user inputs a fingerprint for user authentication while using the electronic device. Example embodiments increase the enrolled area by updating the enrollment DB using an input image that is successfully authenticated. For example, the enrolled images included in the enrollment DB at a second point in time correspond to the second enrolled area 140. The second point in time may be a point in time at which the enrollment DB is updated using a fingerprint image input for user authentication.

According to example embodiments, a convenience for fingerprint enrollment may increase. For example, example embodiments may enroll a predetermined and/or selected number of images at an initial enrollment stage and update an enrollment DB while the user is not aware of the update in an actual use stage.

As will be described later, example embodiments may enroll a new fingerprint region, other than regions in the enrolled images, by deciding whether an input image is to be enrolled in the enrollment DB based on a maximum similarity. The maximum similarity is determined based on sizes of overlap regions between the input image and the enrolled images.

Example embodiments may secure various enrolled images without changing a size of the enrollment DB by replacing a replacement image with the input image. The replacement image is selected from the enrolled images based on similarities calculated based on sizes of overlap regions between the enrolled images. Further, example embodiments may prevent an outlier from being reflected as an enrolled fingerprint by enrolling the input image in the enrollment DB through a comparison of the maximum similarity to a preset and/or selected lower threshold.

In addition, example embodiments may prevent a decrease in a fingerprint recognition rate by excluding an input image including fewer items of fingerprint information from an authentication target. Example embodiments may prevent an incorrectly input fingerprint and a contaminated fingerprint from being enrolled as enrolled images by reviewing enrollment of the input image with respect to which user authentication is accepted in the enrollment DB and example embodiments may also increase a fingerprint recognition rate of a fingerprint recognizer.

Furthermore, example embodiments may update the enrollment DB adaptively based on a time used for authenticating the input image. Example embodiments may also use a result calculated for authenticating the input image for updating the enrollment DB.

Figure 3:
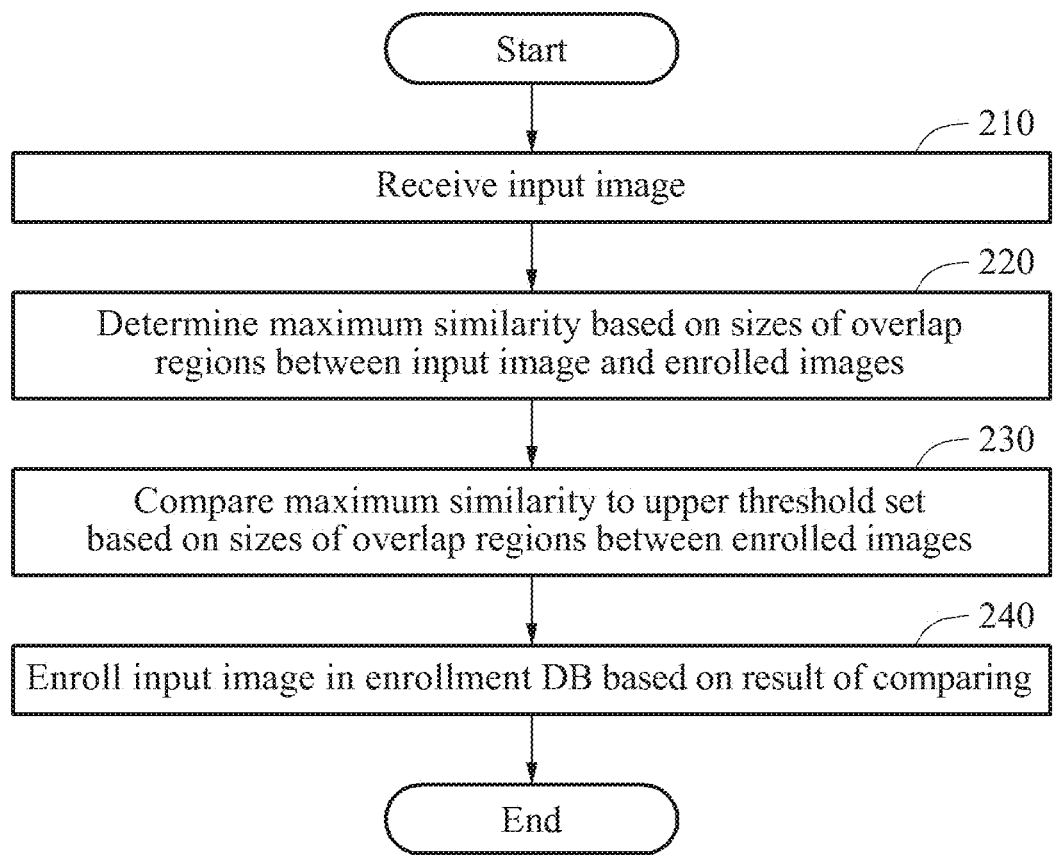

FIG. 3 is a flowchart illustrating an example of a method of updating an enrollment DB. The method of updating the enrollment DB is performed by an apparatus for updating an enrollment DB, hereinafter, the "updating apparatus". For example, the updating apparatus may be included in a fingerprint authenticator, or configured as a separate device.

The updating apparatus may be implemented as hardware or a combination of hardware executing software. A function implemented using software may be performed by the processor when the processor executes instructions associated with the function stored on a computer readable medium. The processor and the hardware may exchange signals through an input/output bus.

Referring to FIG. 3, the updating apparatus receives an input image including biometric information in operation 210. The updating apparatus receives the input image from a sensor configured to sense biometric information. The input image includes biometric information, such as fingerprint information, blood vessel information, and/or iris information, for example.

The updating apparatus determines a maximum similarity based on sizes of overlap regions between the input image and enrolled images in operation 220. The updating apparatus calculates similarities between the input image and the enrolled images based on the sizes of the overlap regions between the input image and the enrolled images. For example, when a number of the enrolled images corresponds to "15", the updating apparatus calculates fifteen similarities: a similarity between the input image and a first enrolled image, a similarity between the input image and a second enrolled image, . . . , and a similarity between the input image and a fifteenth enrolled image. The updating apparatus determines a similarity having a greatest value, among the calculated fifteen similarities, to be the maximum similarity.

Each calculated similarity reflects a similarity between two images within an overlap region, and also reflects a size of the overlap region of the two images. For example, there may be assumed a first case in which two images are the same within an overlap region but a size of the overlap region is considerably small, and a second case in which two images are not the same within an overlap region but a size of the overlap region is considerably large. When considering only the similarity between the two images within the overlap region, the similarity of the first case may be calculated to be higher than the similarity of the second case. However, according to example embodiments, the similarity of the second case may be calculated to be higher than the similarity of the first case.

A method of calculating a similarity between an input image and one enrolled image using the updating apparatus will be described with reference to FIG. 4, and a method of determining a maximum similarity will be described with reference to FIG. 5.

Referring back to FIG. 3, the updating apparatus compares the maximum similarity to an upper threshold set based on sizes of overlap regions between the enrolled images in operation 230. The upper threshold may include a second maximum similarity having a greatest value among the similarities calculated based on the sizes of the overlap regions between the enrolled images. For example, the upper threshold may be a similarity calculated based on a size of an overlap region between two enrolled images having a largest overlap region, among the enrolled images.

The updating apparatus enrolls the input image in an enrollment DB based on a result of the comparing in operation 240. The updating apparatus verifies whether the maximum similarity determined between the input image and the enrolled images is less than the upper threshold. The updating apparatus updates the enrollment DB to increase an enrolled area by enrolling the input image in the enrollment DB in response to the maximum similarity being less than the upper threshold.

Here, "the maximum similarity being less than the upper threshold" indicates that a similarity calculated based on overlap regions between the input image and the enrolled images is less than a similarity calculated based on overlap regions between the enrolled images. "The maximum similarity being less than the upper threshold" may be construed as indicating that the input image includes a new fingerprint region having a value greater than or equal to a predetermined and/or selected region value, the new fingerprint region not overlapping the enrolled images included in the enrollment DB.

The updating apparatus adds the input image to the enrolled images enrolled in the enrollment DB if the maximum similarity is less than the upper threshold. The updating apparatus selects a replacement image to be replaced with the input image from the enrolled images, and enrolls the input image by replacing the replacement image with the input image.

In response to the maximum similarity being greater than or equal to the upper threshold, the updating apparatus does not update the enrollment DB. For example, in response to the maximum similarity being greater than or equal to the upper threshold, the updating apparatus maintain the replacement image as an enrolled image in the enrollment DB.

In another example embodiment, the updating apparatus also compares the maximum similarity to a preset and/or selected lower threshold. The updating apparatus enrolls the input image in the enrollment DB based on a result of comparing the maximum similarity to the lower threshold. In response to the maximum similarity being greater than the lower threshold, the updating apparatus enrolls the input image in the enrollment DB. The "lower threshold" may be construed as a minimum similarity used for recognizing the input image as a fingerprint of a user corresponding to an authentication target. Here, "the maximum similarity being greater than the lower threshold" may be construed as indicating that the input image includes a region overlapping enrolled images to appear in a case of the same user, the overlapping region having a value greater than or equal to a predetermined and/or selected region value. The updating apparatus prevents an outlier from being reflected as an enrolled fingerprint by enrolling the input image in the enrollment DB in response to the maximum similarity being greater than the lower threshold.

Example embodiments increase a fingerprint recognition rate for an enrolled user while preventing contamination of the enrollment DB by a fingerprint of another user by updating the enrollment DB only when the maximum similarity is in a range between the upper threshold and the lower threshold.

Figure 4:
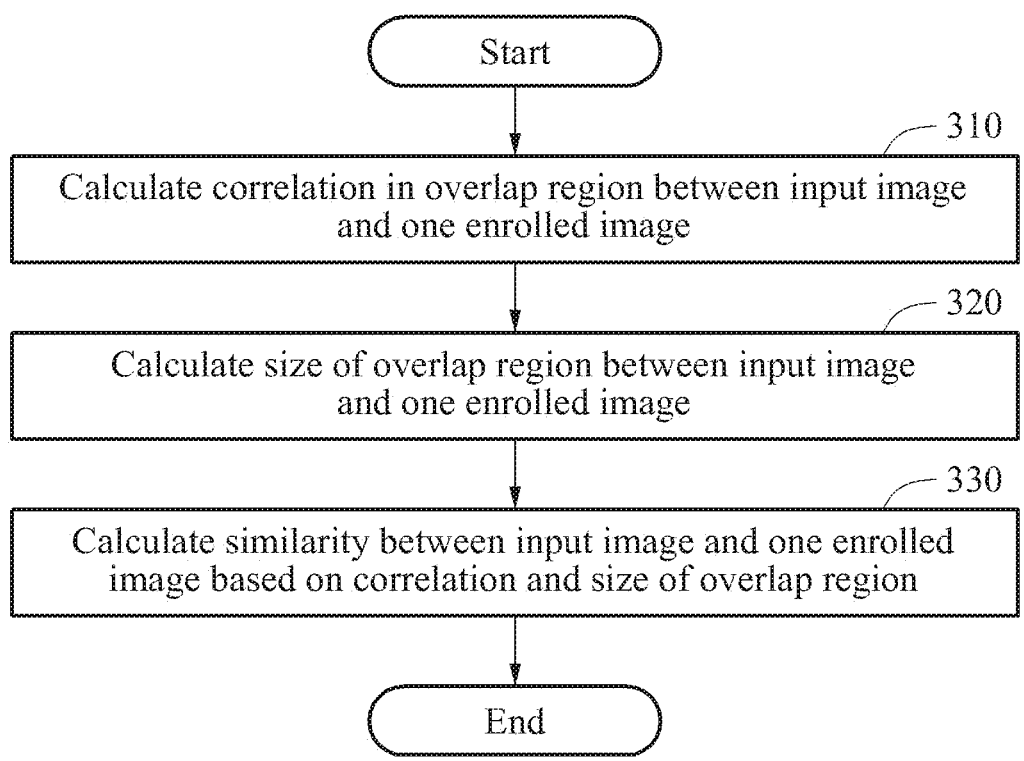

FIG. 4 is a flowchart illustrating an example embodiment of a method of calculating a similarity.

Referring to FIG. 4, an updating apparatus calculates a correlation in an overlap region between an input image and one of the enrolled images in operation 310. The correlation in the overlap region may be, for example, a normalized cross correlation (NCC) value.

The updating apparatus calculates a size of the overlap region between the input image and the one enrolled image in operation 320. The size of the overlap region may be referred to as a "sharing image area". The updating apparatus calculates a sharing area ratio between the input image and the one enrolled image based on the sharing image area.

The updating apparatus calculates a similarity between the input image and the one enrolled image based on the correlation and the size of the overlap region in operation 330. For example, the similarity is calculated by multiplying the NCC value by the sharing image area.

Figure 5:
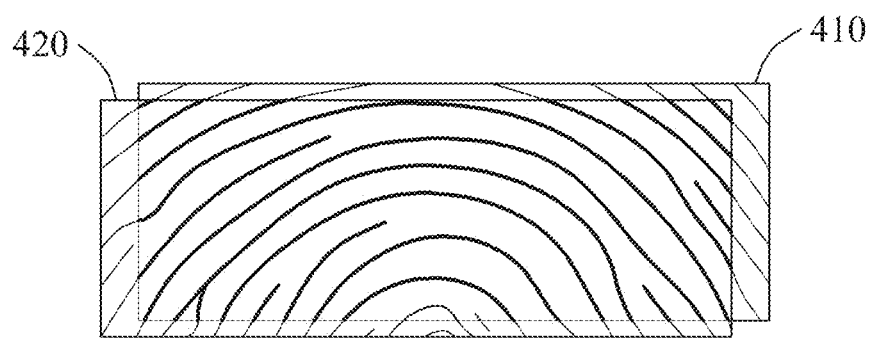

FIG. 5 is a diagram illustrating an example embodiment of a method of determining a maximum similarity. Referring to FIG. 5, an enrolled image 410 and an input image 420 are illustrated.

An updating apparatus calculates similarities between an input image and enrolled images, and determines a similarity having a greatest value, among the similarities, to be a maximum similarity. For example, when a number of the enrolled images corresponds to "15", and a first enrolled image of the fifteen enrolled images corresponds to the enrolled image 410, the updating apparatus may calculate a similarity between the input image 420 and the enrolled image 410 as follows.

The updating apparatus calculates a translation vector and an angle of rotation between the enrolled image 410 and the input image 420 through an image registration between the enrolled image 410 and the input image 420. The image registration is a processing technique that represents different images on a single coordinate system by deforming the images. Through the image registration, a correspondence between images acquired by different measuring schemes may be verified. The image registration is divided into a spatial domain method and a frequency domain method.

The spatial domain method is a method of matching patterns or features of pixel intensities of an image in a space of the image. When a number of pairs of feature points included in two images is greater than a minimum number used for image deformation, the image deformation between the two images may be detected, for example using a random sample consensus (RANSAC) scheme. Further, the frequency domain method is a method of detecting parameters used for deformation between the two images directly in a frequency domain. The parameters include, for example, a translation of an image, an angle of rotation, and a change in size.

The updating apparatus calculates an NCC value based on the calculated translation vector and the angle of rotation. For example, an NCC value between two images $I_1$ and $I_2$ is calculated using Equation 1.

$$ncc(I_1, I_2) = \frac{\sum_{(i,j) \in W} I_1(i, j) \cdot I_2(x+i, y+j)}{\sqrt[2]{\sum_{(i,j) \in W} I_1^2(i, j) \cdot \sum_{(i,j) \in W} I_2^2(x+i, y+j)}} \qquad \text{[Equation 1]}$$

In Equation 1, W denotes an overlap region between the image $I_1$ and the image $I_2$. i denotes an X-axial coordinate of an image, j denotes a Y-axial coordinate of the image, x denotes an X-axial translation value, and y denotes a Y-axial translation value. $I_1(i, j)$ denotes a pixel value of the image $I_1$ at coordinates of (i, j), and $I_2(x+i, y+j)$ denotes a pixel value of the image $I_2$ at coordinates of (x+i, y+j). The image $I_1$ may correspond to the enrolled image 410, and the image $I_2$ may correspond to the input image 420.

The updating apparatus calculates a size of the overlap region between the enrolled image 410 and the input image 420. The size of the overlap region may be a sharing image area. The updating apparatus calculates a sharing area ratio between the enrolled image 410 and the input image 420 based on the sharing image area. For example, the sharing area ratio is obtained by Equation 2.

$$r_{overlap}(I_1, I_2) = \frac{\text{Sharing Image area}}{\text{Whole image area}} \quad \text{[Equation 2]}$$

The updating apparatus calculates a sharing image area with respect to a whole image area of the enrolled image 410 and the input image 420 as the sharing area ratio. It should be understood that each of the enrolled image 410 and input image 420 have a same whole image area size. The updating apparatus calculates the sharing area ratio by assigning a weight to the sharing image area.

The updating apparatus calculates the similarity between the enrolled image 410 and the input image 420 based on the NCC value and the sharing area ratio. The similarity between the enrolled image 410 and the input image 420 is obtained by Equation 3.

$$s_{overlap}(I_1,I_2) = ncc(I_1,I_2) \times r_{overlap}(I_1,I_2) \quad \text{[Equation 3]}$$

The updating apparatus calculates the similarity between the enrolled image 410 and the input image 420 by multiplying the NCC value by the sharing area ratio.

The updating apparatus calculates similarities between the input image 420 and the remaining fourteen enrolled images, excluding the enrolled image 410 for which the similarity is calculated, in the same manner as described above. The updating apparatus determines a similarity having a greatest value, among the calculated fifteen similarities, to be the maximum similarity.

Figure 6:
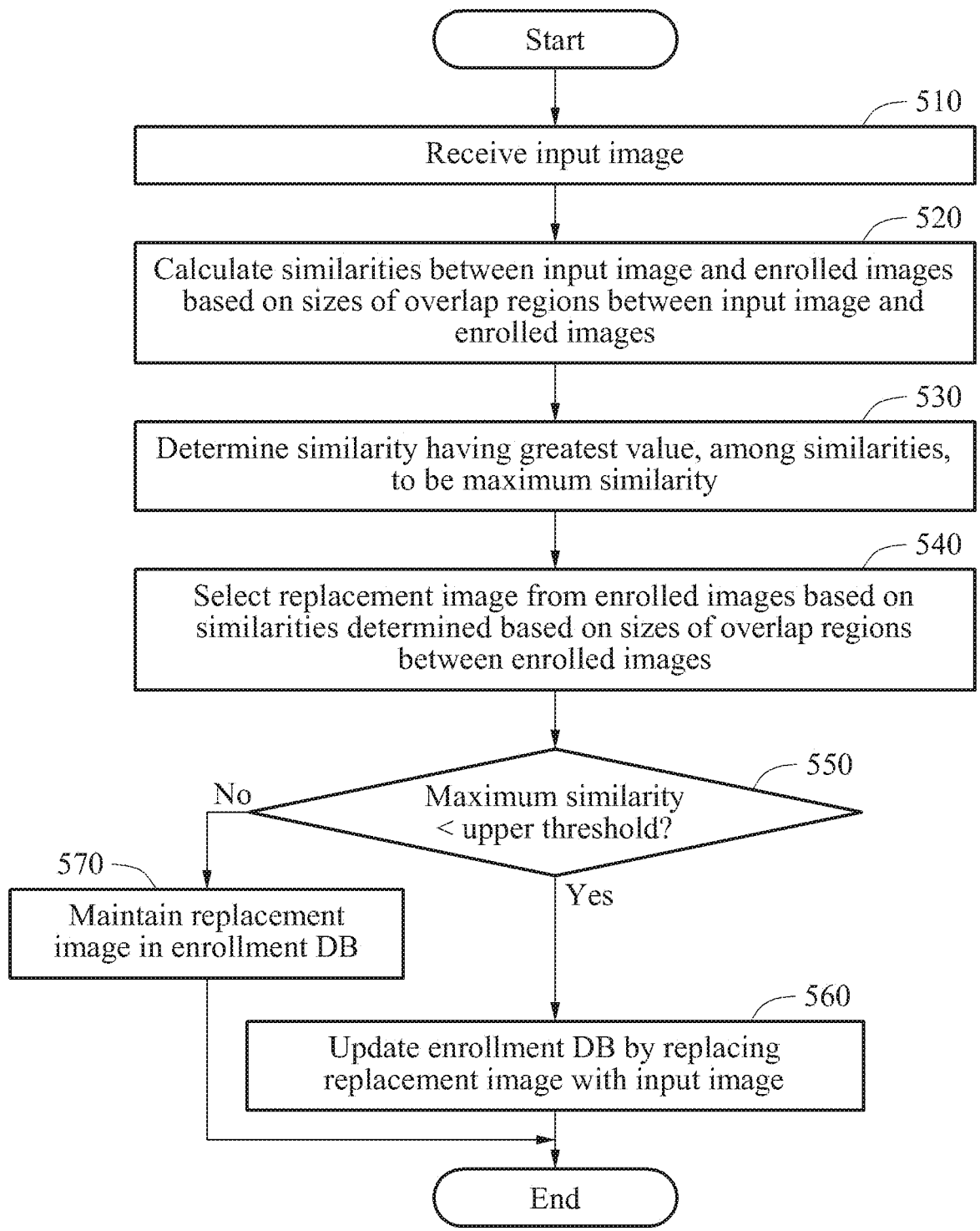

FIG. 6 is a flowchart illustrating an example embodiment of a method of updating an enrollment DB.

Referring to FIG. 6, an updating apparatus receives an input image including biometric information in operation 510. The updating apparatus calculates similarities between the input image and enrolled images based on sizes of overlap regions between the input image and the enrolled images in operation 520. The updating apparatus determines a similarity having a greatest value, among the calculated similarities, to be a maximum similarity in operation 530. The updating apparatus selects a replacement image from the enrolled images based on similarities calculated based on sizes of overlap regions between the enrolled images in operation 540. A method of selecting a replacement image using the updating apparatus will be described with reference to FIGS. 7 through 9.

Referring back to FIG. 6, the updating apparatus verifies whether the maximum similarity is less than an upper threshold in operation 550. The upper threshold may be, for example, a second maximum similarity having a greatest value among the similarities calculated based on the sizes of the overlap regions between the enrolled images. In response to verifying that the maximum similarity is less than the upper threshold, the updating apparatus updates an enrollment DB by replacing the replacement image with the input image in operation 560. Conversely, in response to verifying that the maximum similarity is greater than or equal to the upper threshold, the updating apparatus maintains the replacement image in the enrollment DB in operation 570.

Figure 7:
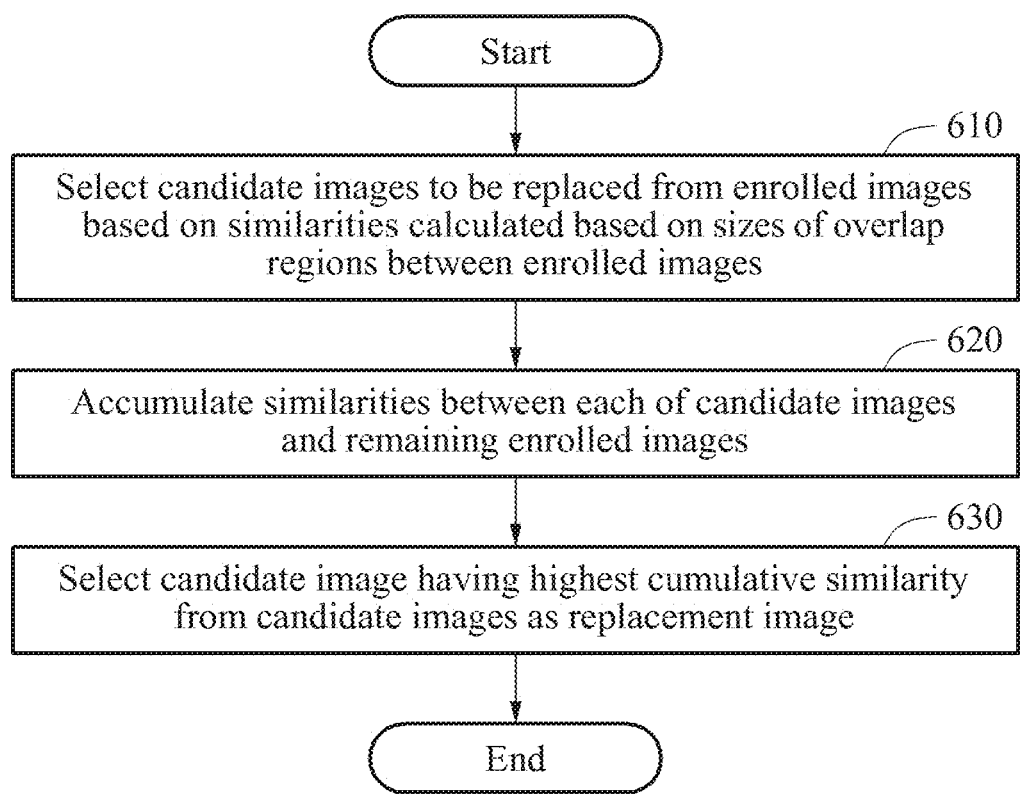

FIG. 7 is a flowchart illustrating an example of a method of selecting a replacement image. In an example, an updating apparatus primarily selects candidate images that stores most items of overlapping information, and selects a candidate image that stores more information overlapping with those of remaining enrolled images than the other candidate images as a replacement image.

Referring to FIG. 7, the updating apparatus selects candidate images to be replaced from enrolled images based on similarities calculated based on sizes of overlap regions between the enrolled images in operation 610. Enrolled images with high similarities are selected as the candidate images to be replaced to delete an overlapping enrolled image because substantially identical or almost similar enrolled images do not need to be maintained in duplication in an enrollment DB.

The updating apparatus detects enrolled images corresponding to the maximum similarity among the similarities calculated based on the sizes of the overlap regions between the enrolled images. The updating apparatus selects the enrolled images corresponding to the maximum similarity as the candidate images to be replaced. A similarity calculated based on a size of an overlap region is calculated between two different images and thus, the candidate images corresponding to the maximum similarity may be two enrolled images.

The updating apparatus accumulates similarities between each of the selected candidate images and remaining enrolled images in operation 620. Here, the "remaining enrolled images" correspond to remaining enrolled images excluding the candidate images to be replaced from the enrolled images. The updating apparatus calculates a cumulative similarity between the candidate images and the remaining enrolled images using Equation 4.

$$s(j) = \sum_{i=1, i \neq j}^{M} s_{overlap}(i, j) \quad \text{[Equation 4]}$$

In Equation 4, $s_{overlap}(i,j)$ denotes a similarity between an i-th enrolled image and a j-th enrolled image. The j-th enrolled image is one of the two candidate images. M denotes a number of enrolled images. In another example, in a case of i=j, $s_{overlap}(i,j)$ may be calculated to be the same value, for example, a maximum value, irrespective of j. Thus, a condition i≠j may be omitted when calculating Σ of s(j).

For example, when the number of the enrolled images corresponds to "18", and candidate images to be replaced are a 13-th enrolled image and an 18-th enrolled image, the updating apparatus calculates a cumulative similarity s(13) between the 13-th enrolled image and remaining enrolled images, and calculates a cumulative similarity s(18) between the 18-th enrolled image and remaining enrolled images.

The updating apparatus selects a candidate image with a highest cumulative similarity from the candidate images as a replacement image in operation 630. The updating apparatus selects a candidate image with a higher similarity between the cumulative similarity s(13) and the cumulative similarity s(18) as the replacement image.

Figure 8:
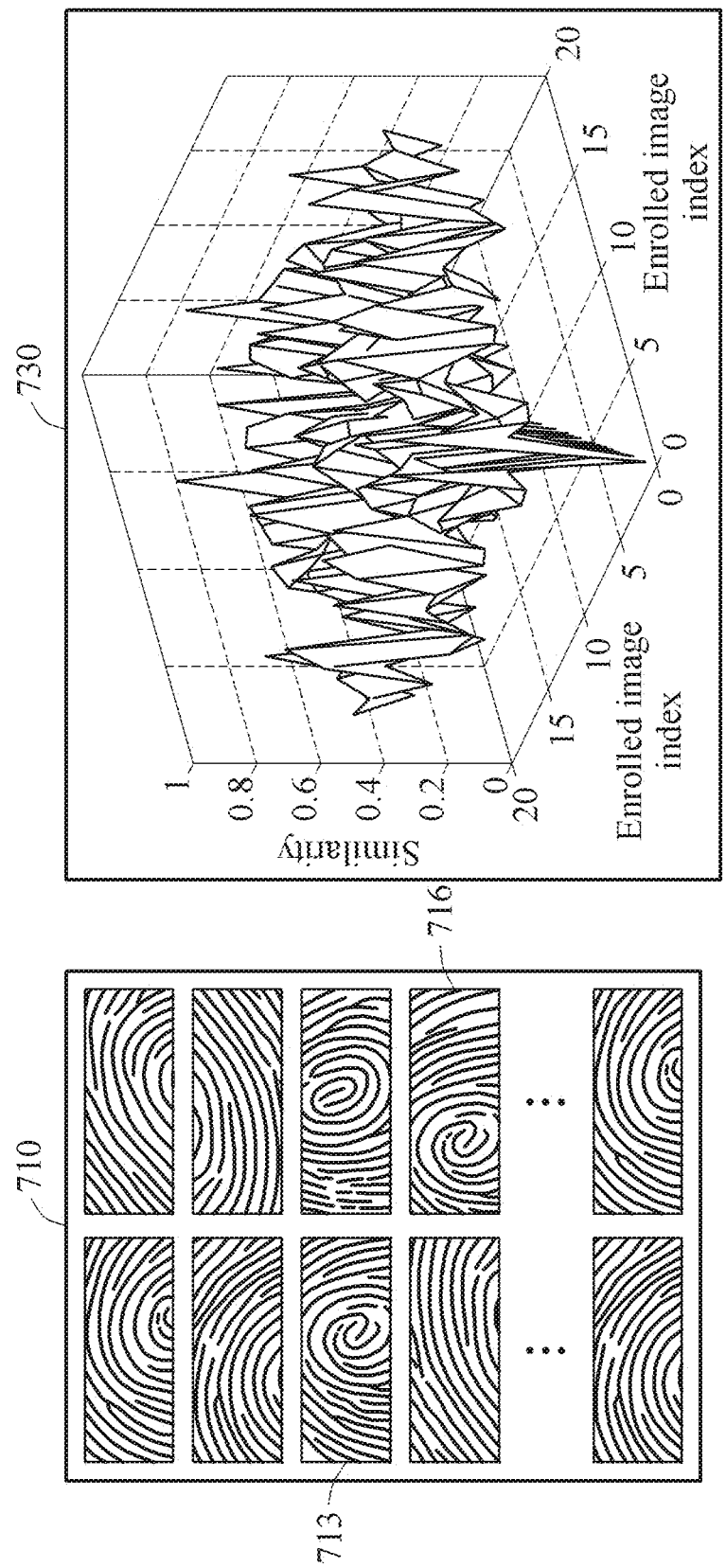

FIGS. 8 and 9 are diagrams illustrating an example embodiment of a method of selecting a replacement image.

Referring to FIGS. 8 and 9, enrolled images 710 and graphs 730 and 810 projecting similarities between the enrolled images 710 in a three-dimensional (3D) matrix are illustrated. In the graphs 730 and 810, an axis X and an axis Y denote indices of enrolled images, and an axis Z denotes a similarity between the enrolled images.

For example, when a similarity between an enrolled image 713 and an enrolled image 716, among the enrolled images 710, is a maximum similarity, an updating apparatus detects enrolled images having the maximum similarity by detecting enrolled images corresponding to points 815 marked on the graph 810 of FIG. 9.

A graph 830 represents a cumulative similarity of candidate images. The graph 830 corresponds to a result of one-dimensionally projecting the graph 810 of FIG. 9 projected in the 3D matrix. In the graph 830, an axis X denotes indices of enrolled images, and an axis Y denotes a cumulative similarity.

In an example, when the indices of the candidate images correspond to "13" and "18", the updating apparatus compares a cumulative similarity s(18) corresponding to an 18-th enrolled image to a cumulative similarity s(13) corresponding to a 13-th enrolled image. A "higher cumulative similarity" indicates more overlaps with other enrolled images and thus, a more overlapping enrolled image is selected as the replacement image. The updating apparatus selects the 18-th enrolled image having a higher cumulative similarity as the replacement image. The 13-th enrolled image has a relatively high possibility of covering a new region when compared to the 18-th enrolled image and thus, is maintained in the enrollment DB.

Figure 10:
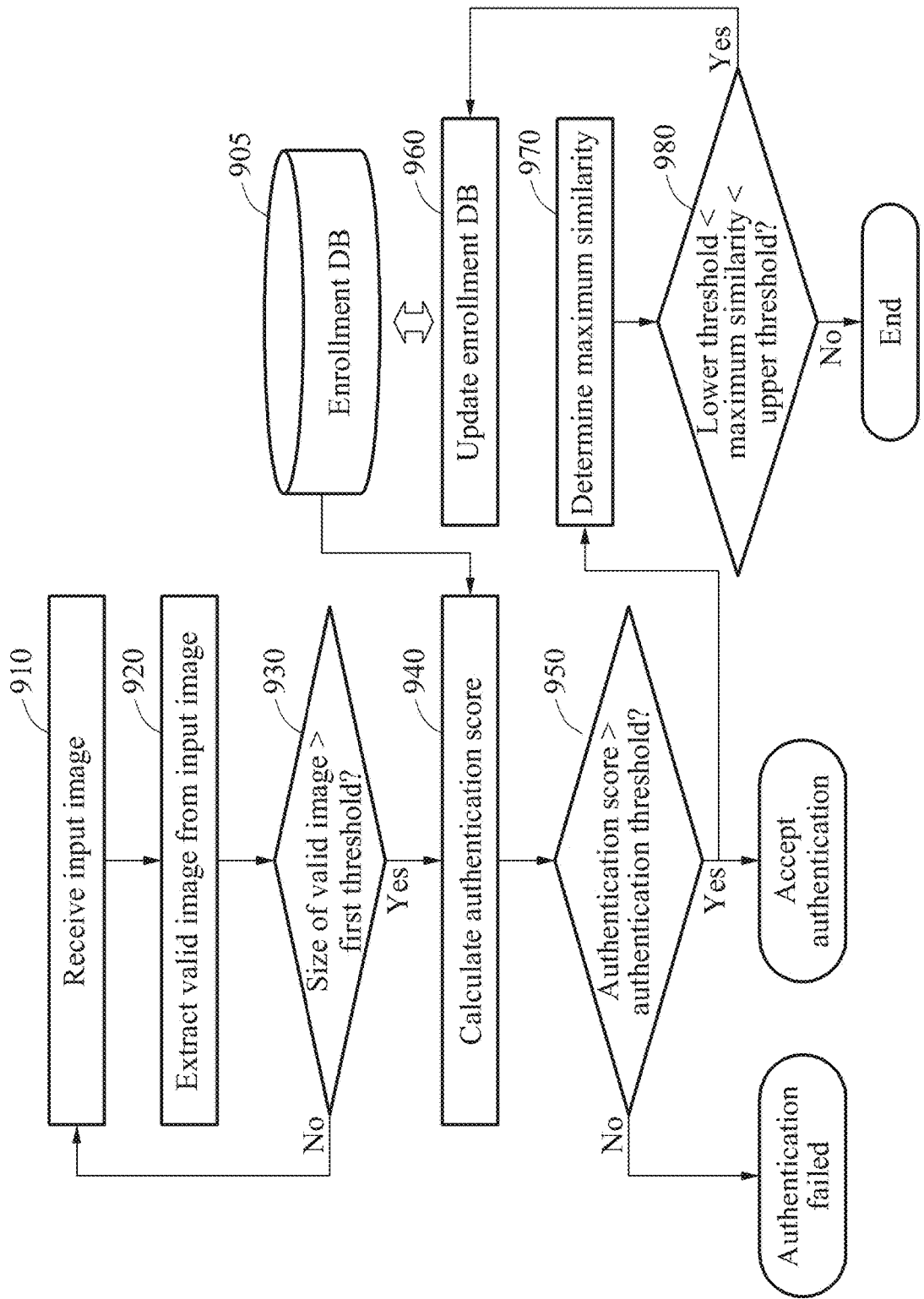

FIG. 10 is a flowchart illustrating an example embodiment of a method of updating an enrollment DB.

Referring to FIG. 10, an updating apparatus receives an input image in operation 910. The updating apparatus extracts a valid image from the input image in operation 920. The updating apparatus verifies whether a size of the valid image is greater than a first threshold in operation 930. In response to verifying that the size of the valid image is greater than the first threshold, the updating apparatus calculates an authentication score in operation 940. In response to verifying that the size of the valid image is less than or equal to the first threshold, the updating apparatus rejects authentication, and receives a new input image by providing the user with a phrase guiding the user to input a new image in operation 910.

In operation 940, the updating apparatus may calculate the authentication score using various schemes. For example, the updating apparatus calculates the authentication score considering a size of an overlap area in one example embodiment and calculates the authentication score not considering the size of the overlap area in another example embodiment. The updating apparatus may divide the input image into small blocks, calculates scores of the respective blocks, and calculates the authentication score by integrating the calculated scores of the respective blocks.

The updating apparatus verifies whether the authentication score is greater than a preset and/or selected authentication threshold in operation 950. For example, the preset and/or selected authentication threshold is an authentication score between enrolled images. The updating apparatus performs user authentication with respect to the input image by comparing the authentication score to the authentication threshold. In response to verifying that the authentication score is less than or equal to the preset and/or selected authentication threshold, the updating apparatus determines the user authentication with respect to the input image as failed. Conversely, in response to verifying that the authentication score is greater than the preset and/or selected authentication threshold, the updating apparatus accepts the user authentication. With respect to the input image for which the user authentication is accepted, whether the input image is to be updated to an enrolled image is reviewed.

The updating apparatus determines a maximum similarity Smax based on similarities calculated between the enrolled images and the input image with respect to which the user authentication is accepted in operation 970. The calculated similarities are similarities calculated based on sizes of overlap regions. Hereinafter, the input image may be construed as an input image with respect to which user authentication is accepted.

The updating apparatus verifies whether the determined maximum similarity is greater than a lower threshold and less than an upper threshold in operation 980. The upper threshold corresponds to a maximum similarity determined based on sizes of overlap regions between enrolled images included in an enrollment DB 905. For example, as previously described, the updating apparatus detects a pair of enrolled images with a highest similarity among the enrolled images, and defines the similarity of the detected pair of enrolled images as a second maximum similarity. The second maximum similarity is used as the upper threshold. In an example, when the input image and enrolled images have a predetermined and/or selected or larger overlap region and the maximum similarity is greater than the lower threshold, the updating apparatus enrolls the input image in the enrollment DB. The use of the lower threshold prevents an outlier from being reflected as an enrolled fingerprint.

In response to verifying that the maximum similarity is greater than the lower threshold and less than the upper threshold, the upper apparatus updates the enrollment DB 905 in operation 960. The updating apparatus adds the input image to the enrollment DB 905. The updating apparatus also replaces one of the enrolled images of the enrollment DB 905 with the input image as previously described. In this example, the updating apparatus selects a replacement image from the enrolled images in the enrollment DB 905 based on similarities calculated based on sizes of overlap regions between the enrolled images in operation 960. In response to verifying that the maximum similarity is less than the lower threshold or greater than the upper threshold, the updating apparatus does not update the enrollment DB 905 in operation 960.

Figure 11:
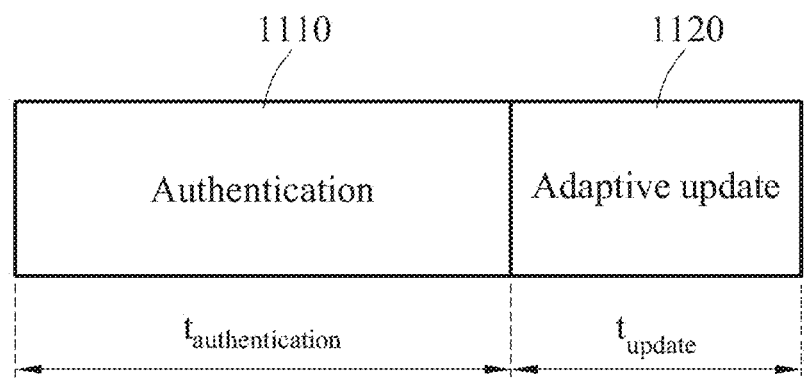

Technique for Updating Enrollment DB Adaptively Based on Time Used for Authentication FIG. 11 is a diagram illustrating an example embodiment of a process of authenticating biometrics.

Referring to FIG. 11, the process of the authenticating biometrics includes an authentication operation 1110 and an adaptive update operation 1120.

In the authentication operation 1110, authentication of an input image is performed. For example, and as previously described, in the authentication operation 1110, the input image is compared to enrolled images included in an enrollment DB, and a score is calculated. When the calculated score is greater than a predetermined and/or selected authentication threshold, authentication succeeds. Conversely, when the calculated score is less than or equal to the predetermined and/or selected authentication threshold, the authentication is failed.

In the adaptive update operation 1120, operations for updating the enrollment DB are performed. For example, in the adaptive update operation 1120, the scheme of updating an enrollment DB based on similarities calculated based on sizes of overlap regions described with reference to FIGS. 1 through 10 is performed.

Although not shown in the drawings, the process of authenticating biometrics may further include a pre-processing operation in advance of the authentication operation 1110. In the pre-processing operation, pre-processing operations for authenticating the input image are performed. The pre-processing operations include an operation of enhancing the input image, and an operation of detecting a valid area in the input image.

Figure 12:
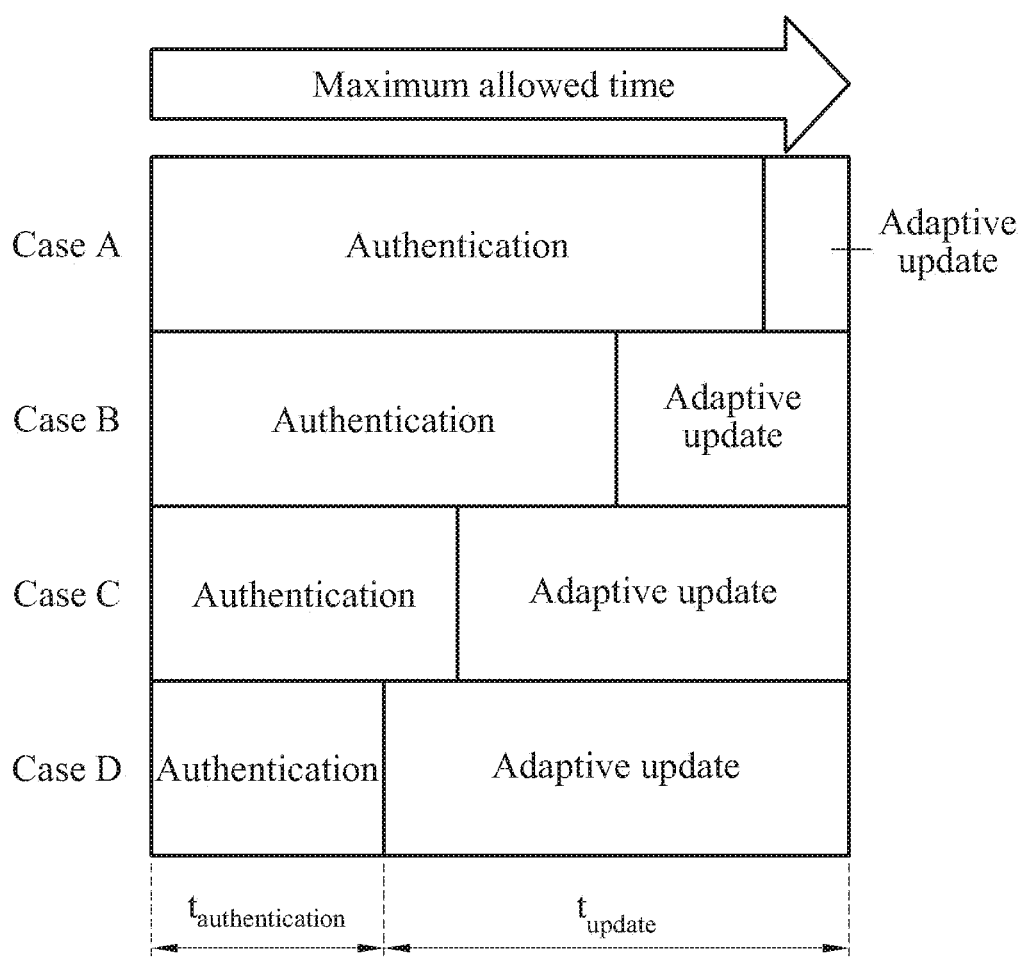

FIG. 12 is a diagram illustrating an example embodiment of adaptive update of an enrollment DB.

Referring to FIG. 12, a process of authenticating biometrics has a maximum allowed time limit, hereinafter, "the maximum allowed time." When the maximum allowed time is determined, an authentication operation and an adaptive update operation are to be performed within the maximum allowed time.

In an example, a technique of reducing a search candidate group through a multi-stage authentication scheme and performing authentication is applied to the authentication operation. The multi-stage authentication scheme includes two operations: a coarse search and a fine search, or at least three operations. In this example, the search candidate group is reduced through a minimum computation at each stage, and precise matching is performed at a final stage.

In response to a computation result being greater than or equal to a predetermined and/or selected score at an early stage before the final stage, the multi-stage authentication scheme suspends the authentication or search operation and decides to early accept. Thus, an authentication accuracy is guaranteed and an authentication rate increases.

When the multi-stage authentication scheme is used, a time used in the authentication operation varies for each case. For example, a time used for authentication in a case A is longer than a time used for authentication in a case D.

When the maximum allowed time is determined, a time allowed for adaptive update decreases as a time used for authentication increases. For example, a time allowed for adaptive update in the case A is shorter than a time allowed for adaptive update in the case D.

Example embodiments select a method of updating an enrollment DB by predicting a time to be used for an authentication and a future available time. Example embodiments improve authentication performance while minimizing an authentication time.

For example, in a case in which the enrollment DB is updated only when a time for updating the enrollment DB is sufficiently secured similar to the case D, a performance of a fingerprint recognizer does not improve. That is because an early accepted input image has a high possibility of being similar to an enrolled image. As described with reference to FIG. 2, a recognition rate of the fingerprint recognizer increases in proportion to an enrolled area. Since an input image significantly similar to an enrolled image scarcely includes information other than information included in the enrolled image, the enrolled area may not increase although the input image is added to the enrollment DB.

Example embodiments update the enrollment DB when a time for updating the enrollment DB is sufficiently secured similar to the case D, and when a time for updating the enrollment DB is insufficient similar to the case A.

Figure 13:
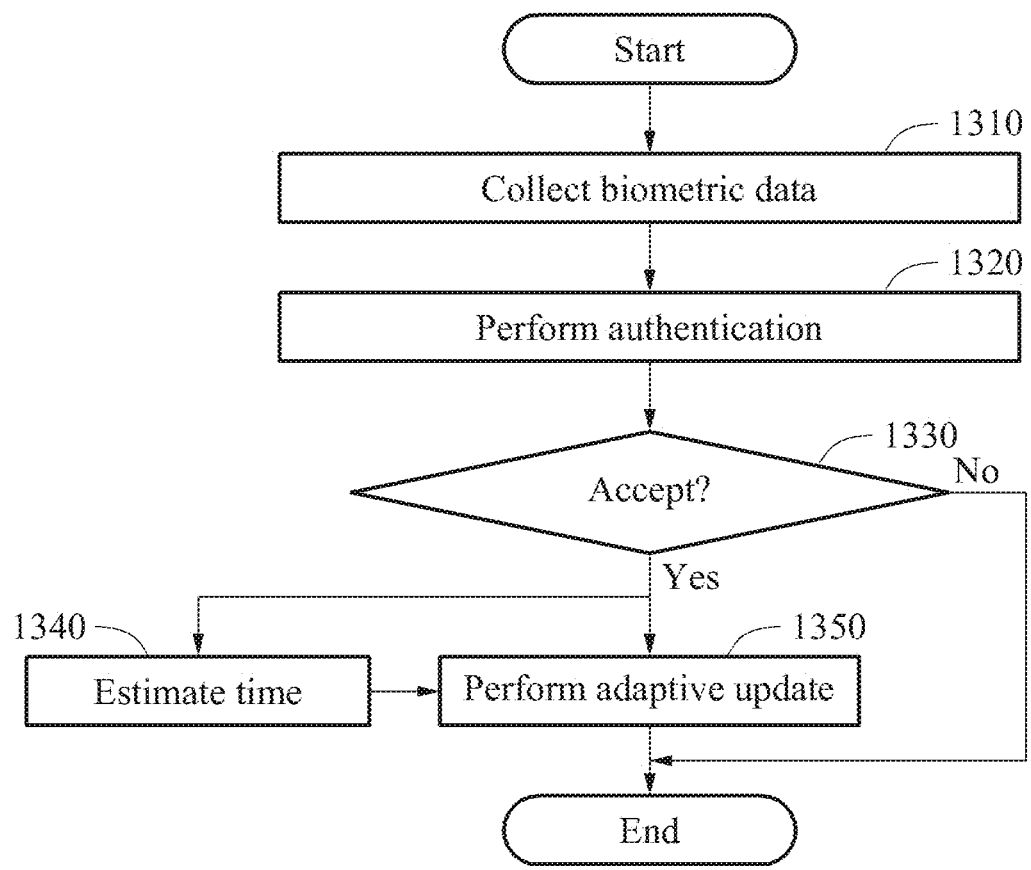

FIG. 13 is a flowchart illustrating an example embodiment of a method of adaptively updating an enrollment DB.

Referring to FIG. 13, an updating apparatus collects biometric data in operation 1310. For example, the updating apparatus receives an input image including fingerprint information from a fingerprint sensor. The updating apparatus performs authentication in operation 1320. In an example, the updating apparatus performs a pre-processing operation in advance of operation 1320.

In response to verifying that the authentication is accepted in operation 1330, the updating apparatus estimates a time used for authenticating the input image in operation 1340. For example, the updating apparatus measures a clock count used for authenticating the input image using a timer, and estimates the time used for authenticating the input image based on the measured clock count. The updating apparatus also predicts a time available for adaptive update from the estimated time.

The updating apparatus updates the enrollment DB adaptively based on the estimated time in operation 1350. The updating apparatus controls the adaptive update so as to perform the authentication and adaptive update operations within a maximum allowed time.

Figure 14:
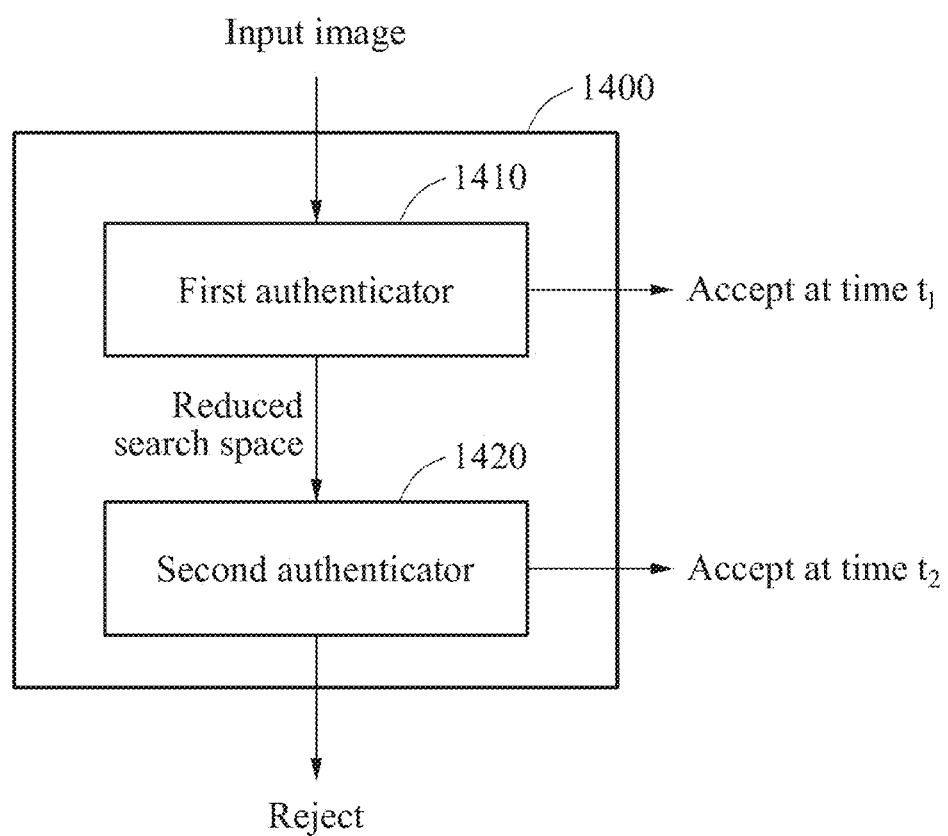

FIG. 14 is a block diagram illustrating an example embodiment of a multi-stage authenticator 1400.

Referring to FIG. 14, the multi-stage authenticator 1400 includes a plurality of authenticators corresponding to a plurality of stages. For example, the multi-stage authenticator 1400 includes a first authenticator 1410 and a second authenticator 1420. Although not shown in the drawings, the multi-stage authenticator 1400 may include at least three stages.

The first authenticator 1410 performs authentication using a coarse search. The first authenticator 1410 verifies whether an authentication score is greater than or equal to a first authentication threshold while comparing an input image to enrolled images using the coarse search. The first authenticator 1410 accepts the authentication and terminates the authentication operation in response to verifying that an authentication score is greater than or equal to the first authentication threshold. In this example, an accept signal is output at a time $t_1$.

When an authentication score greater than or equal to a predetermined and/or selected threshold is not determined while the coarse search is being performed, the first authenticator 1410 transfers a reduced search space to the second authenticator 1420. For example, the first authenticator 1410 extracts a predetermined and/or selected number of candidate groups in an order of an authentication score from enrolled images included in the enrollment DB, and outputs information related to the extracted candidate groups to the second authenticator 1420.

Figure 15:
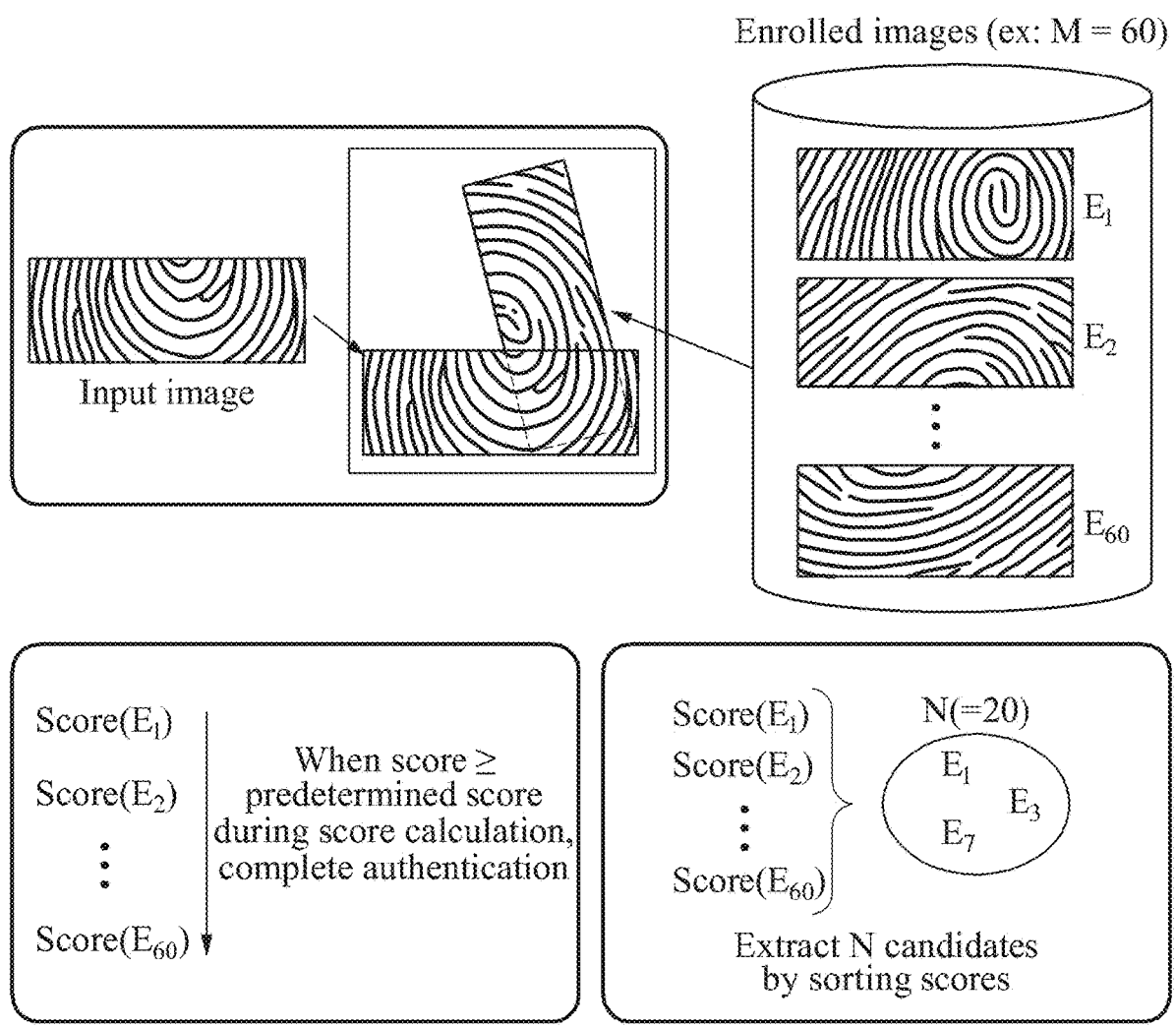

FIG. 15 is a diagram illustrating an example embodiment of a coarse search.

Referring to FIG. 15, the first authenticator 1410 calculates authentication scores by comparing an input image to each enrolled image. In an example, the first authenticator 1410 uses the NCC value of Equation 1 as an authentication score. In another example, the first authenticator 1410 uses a similarity calculated based on a size of an overlap region of Equation 3 as the authentication score.

Referring to FIG. 14 again, the second authenticator 1420 performs authentication using a fine search in the reduced search space. The second authenticator 1420 verifies whether an authentication score is greater than or equal to a second authentication threshold while comparing the input image to the enrolled images using the fine search. The second authenticator 1420 accepts the authentication and terminates the authentication operation in response to verifying that an authentication score is greater than or equal to the second authentication threshold. In this example, an accept signal is output at a time $t_2$. The time $t_2$ is a time after the time $t_1$.

In response to verifying that an authentication score is not greater than or equal to the second authentication threshold in the reduced search space, the second authenticator 1420 does not authenticate the input image and terminates the authentication operation.

Figure 16:
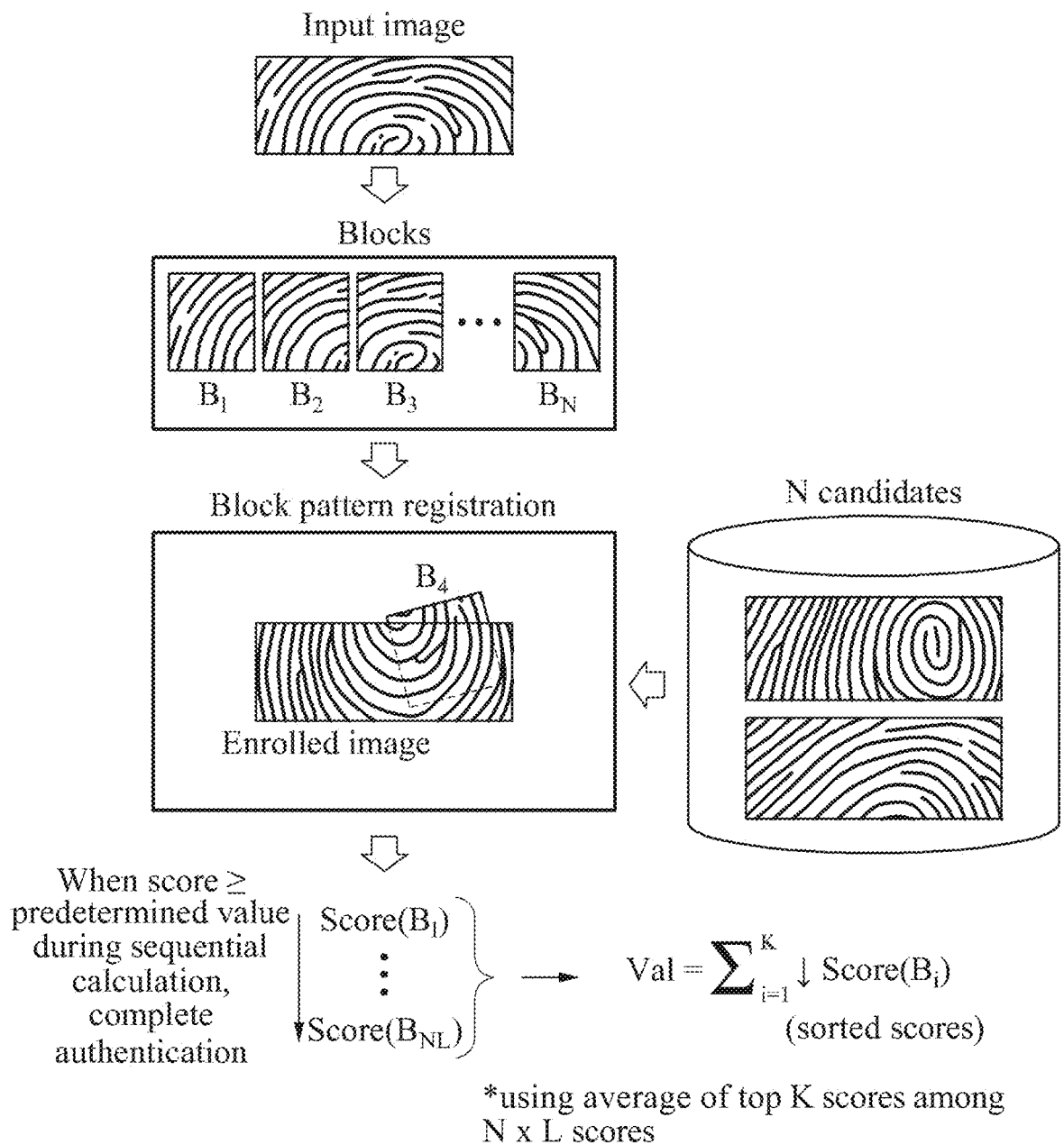

FIG. 16 is a diagram illustrating an example embodiment of a fine search.

Referring to FIG. 16, the second authenticator 1420 divides an input image into a plurality of blocks. The second authenticator 1420 calculates block authentication scores through block pattern registration. The second authenticator 1420 decides whether the input image is to be authenticated based on a sum or average of top K block authentication scores among the calculated block authentication scores.

FIGS. 17 through 22 are diagrams illustrating an example embodiment of an updating apparatus for adaptively updating an enrollment DB.

Figure 17:
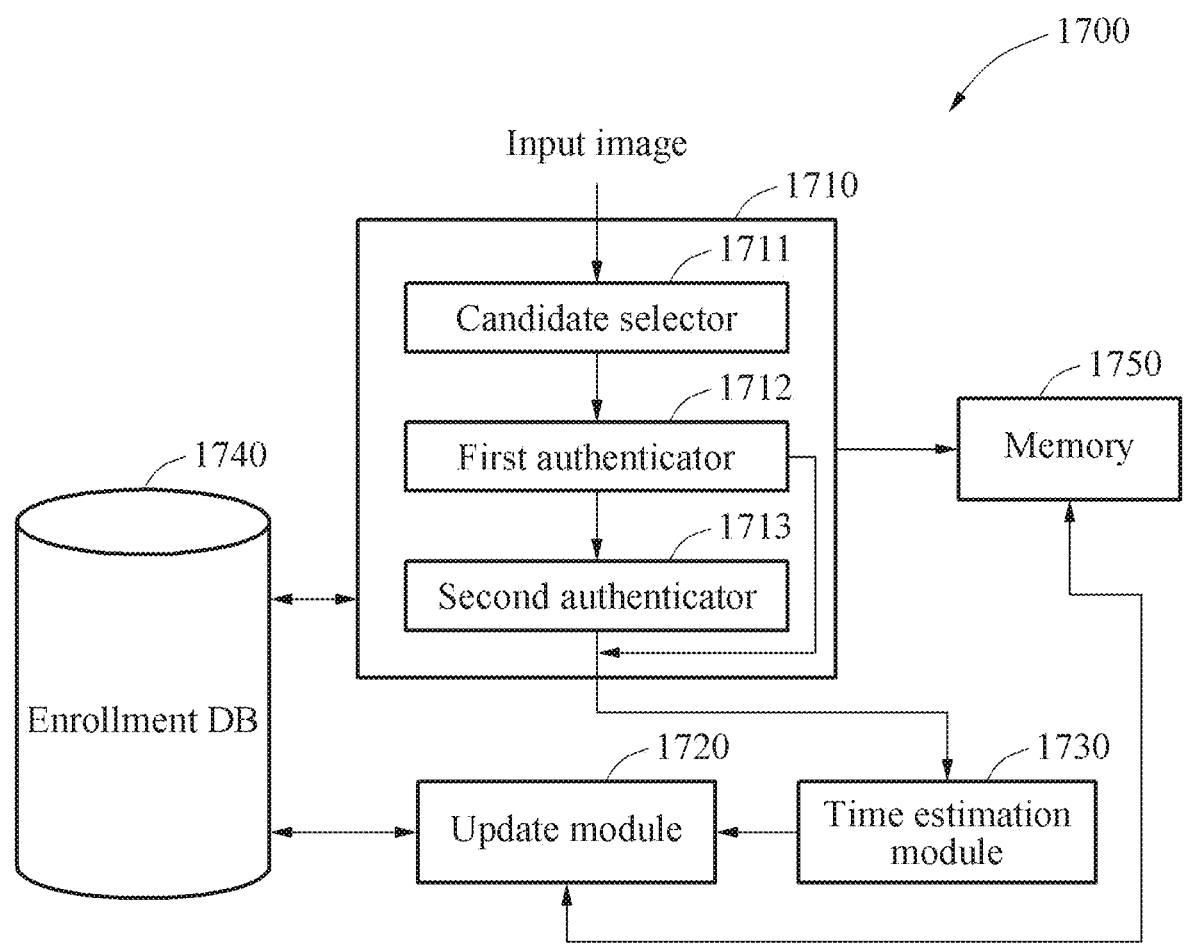

Referring to FIG. 17, an updating apparatus 1700 includes an authentication module 1710, an update module 1720, a time estimation module 1730, an enrollment DB 1740 and a memory 1750 (non-transitory computer-readable storage media).

The authentication module 1710 authenticates an input image and outputs an accept signal or a reject signal. The time estimation module 1730 estimates a time used for authenticating the input image or a time available for adaptive update in response to the accept signal. The update module 1720 updates the enrollment DB 1740. The update module 1720 controls the updating the enrollment DB 1740 based on the time estimated by the time estimation module 1730.

Figure 18:
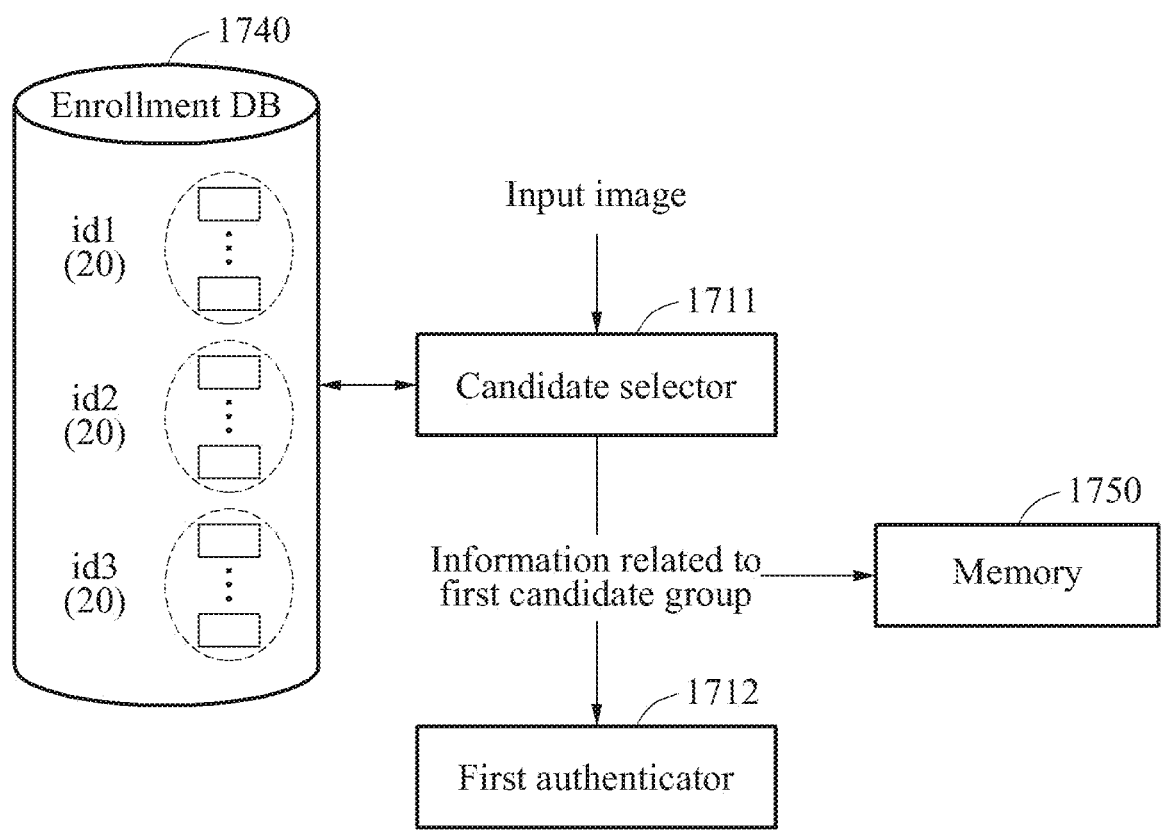

The authentication module 1710 includes a candidate selector 1711, a first authenticator 1712, and a second authenticator 1713. Referring to FIG. 18, the candidate selector 1711 receives the input image. The input image corresponds to a pre-processed result. The candidate selector 1711 extracts a first candidate group from enrolled images included in the enrollment DB 1740. The candidate selector 1711 extracts the first candidate group using various methods.

The enrollment DB 1740 includes twenty enrollment images corresponding to a first identifier id1, twenty enrolled images corresponding to a second identifier id2, and twenty enrolled images corresponding to a third identifier id3. The first identifier, the second identifier, and the third identifier correspond to different fingers of the same user, respectively. The sixty enrolled images correspond to partial images including portions of fingerprints of the corresponding fingers.

The candidate selector 1711 extracts the first candidate group by processing the input image and the enrolled images in a frequency domain. The candidate selector 1711 generates a third image representing a phase correlation between the input image and an enrolled image in a Fourier space, and calculates a variance of the phase correlation in the third image. The candidate selector 1711 classifies the corresponding enrolled image as the first candidate group in response to the calculated variance being greater than or equal to a predetermined and/or selected threshold.

The candidate selector 1711 transfers information related to the first candidate group to the first authenticator 1712. As will be described in detail later, results calculated in the authentication operation are utilized to minimize a computational complexity in the adaptive update operation. The candidate selector 1711 stores the information related to the first candidate group in the memory 1750 for a future adaptive update operation.

Figure 19A:
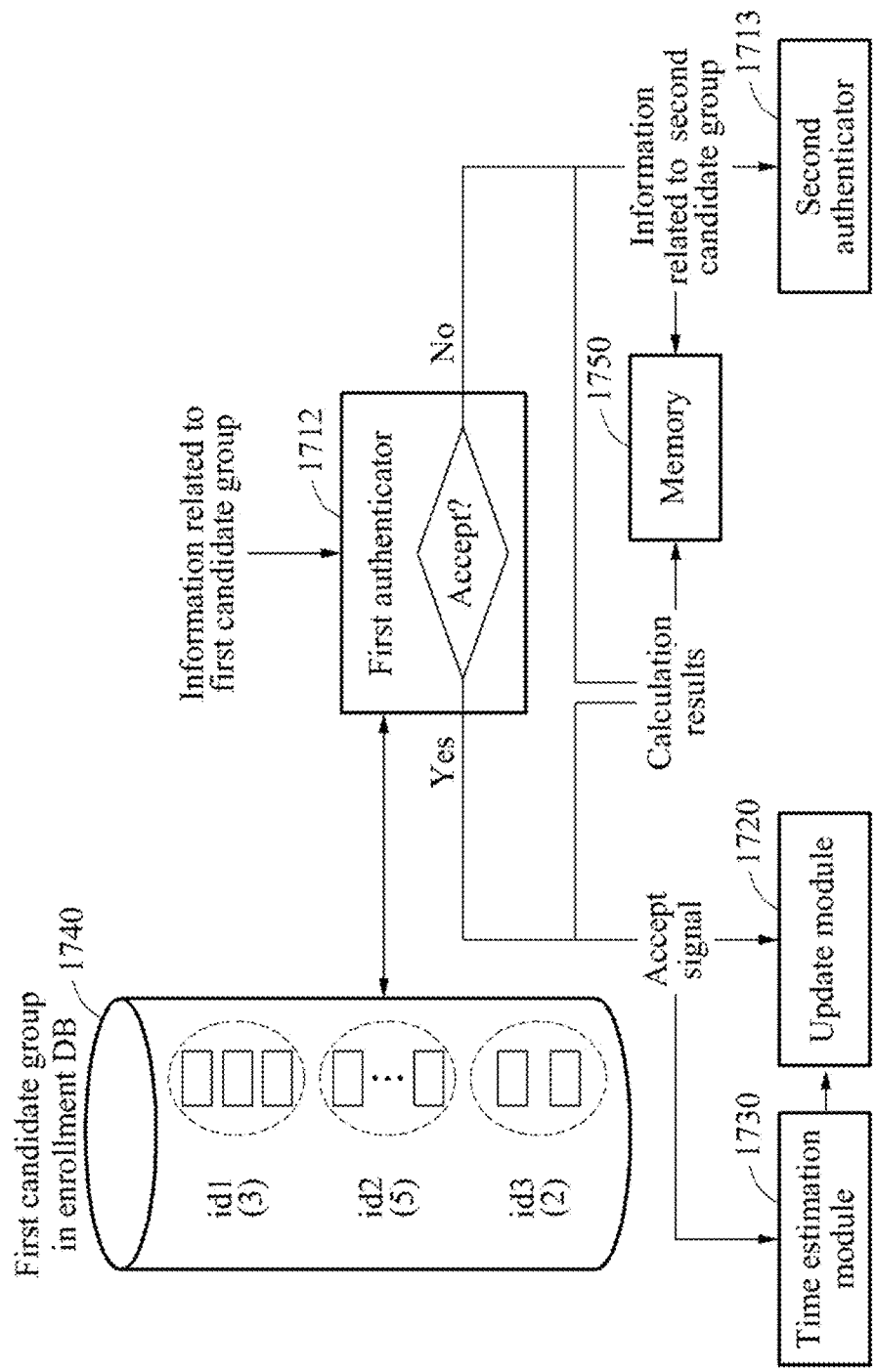

Referring to FIG. 19A, the first authenticator 1712 receives the information related to the first candidate group. The first authenticator 1712 authenticates the input image. The operation described with reference to FIG. 15 is applied to the first authenticator 1712. However, the first authenticator 1712 authenticates the input image using only the first candidate group, rather than using all of the sixty enrolled images in the enrollment DB 1740.

The first authenticator 1712 outputs an accept signal when an authentication score is greater than or equal to a first authentication threshold during the authentication. The output accept signal is transferred to the time estimation module 1730. The results calculated by the first authenticator 1712 are stored in the memory 1750 for the future adaptive update operation.

When an authentication score is not greater than or equal to the first authentication threshold, the first authenticator 1712 extracts a second candidate group corresponding to a predetermined and/or selected number of top authentication scores. The first authenticator 1712 transfers information related to the second candidate group to the second authenticator 1713. The information related to the second candidate group and the results calculated by the first authenticator 1712 are stored in the memory 1750 for the future adaptive update operation.

Figure 19B:
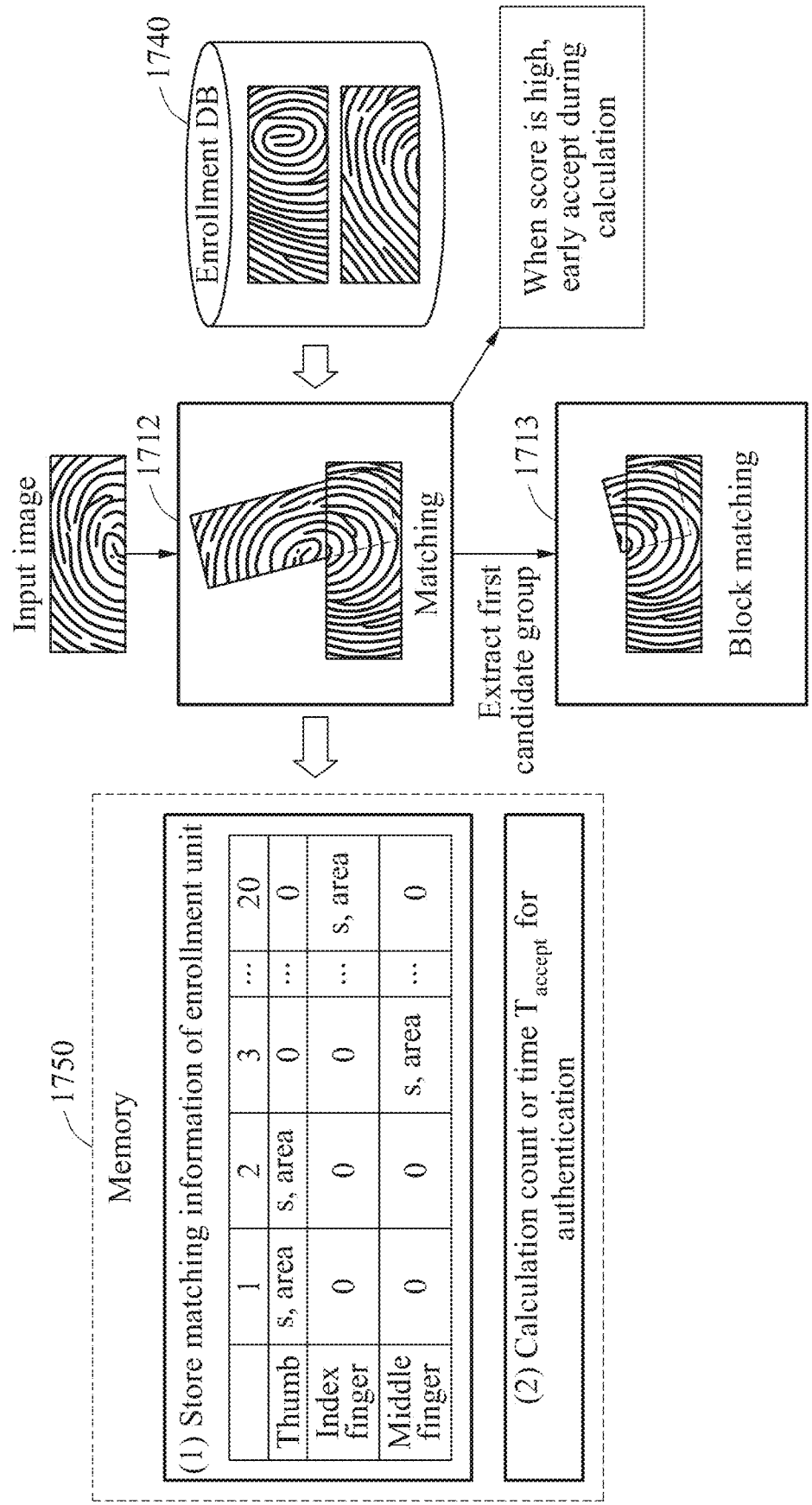

Referring to FIG. 19B, matching information of an enrollment unit and an operation count or time for authentication are stored in the memory 1750. In FIG. 19B, s denotes ncc of Equation 1 or $S_{overlap}$ in Equation 3 and area denotes the sharing area ratio by Equation 2 or a size of an overlap region. In an example, information stored in a first column and a first row of a table in the memory 1750 corresponds to a result of comparing the input image to an enrolled image with an index of "1", among enrolled images corresponding to an identifier of a thumb.

Figure 20:
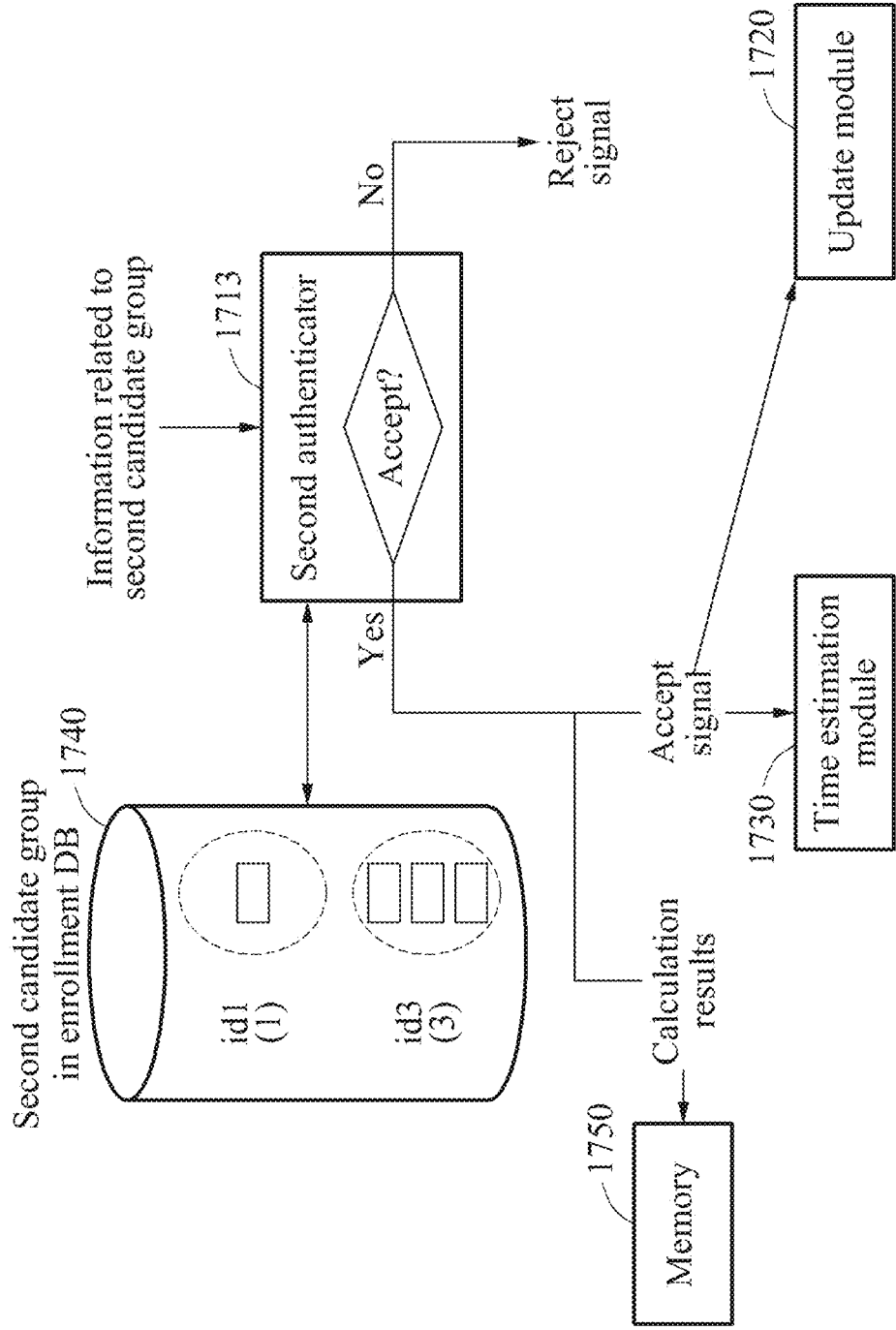

Referring to FIG. 20, the second authenticator 1713 receives the information related to the second candidate group. The second authenticator 1713 authenticates the input image. The operation described with reference to FIG. 16 is applied to the second authenticator 1713. The second authenticator 1713 outputs an accept signal when an authentication score is greater than or equal to a second authentication threshold during the authentication. The output accept signal is transferred to the time estimation module 1730. The results calculated by the second authenticator 1713 are stored in the memory 1750 for the future adaptive update operation. When an authentication score is not greater than or equal to the second authentication threshold, the second authenticator 1713 outputs a reject signal.

Figure 21:
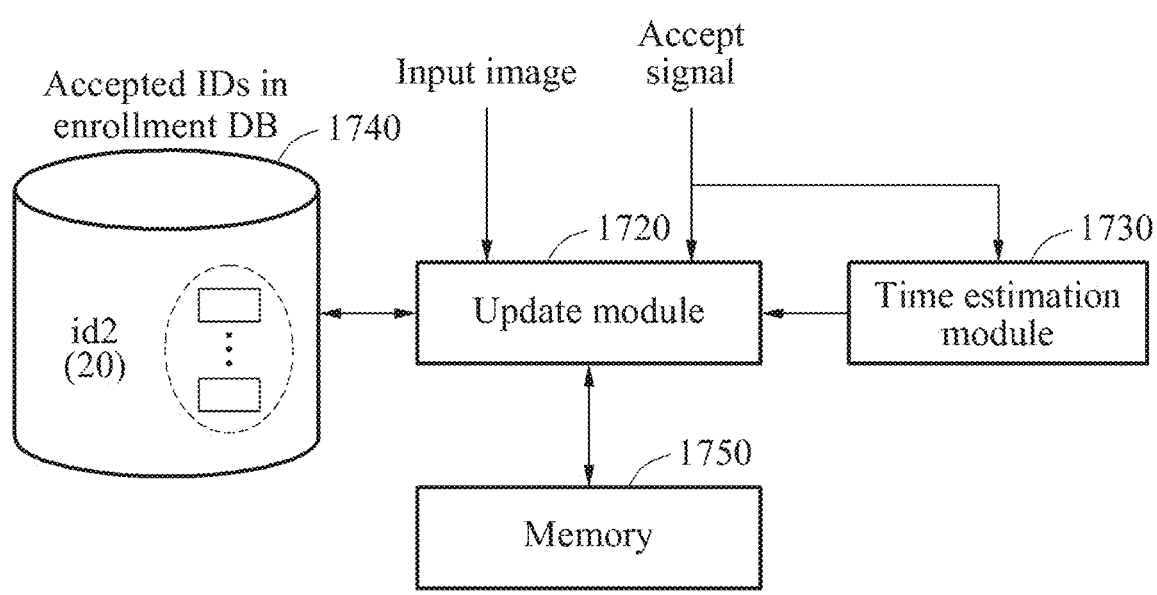

Referring to FIG. 21, the time estimation module 1730 receives the accept signal. The time estimation module 1730 estimates a time used for authenticating the input image or a time available for adaptive update in response to the accept signal. The update module 1720 updates the enrollment DB 1740 based on the input image and the time estimated by the time estimation module 1730.

In an example embodiment, the update module 1720 calculates a maximum similarity based on sizes of overlap regions between the input image and the enrolled images. In this example, the update module 1720 determines only similarities between the input image and the twenty enrolled images corresponding to the accepted identifier, rather than determining all of the similarities between the input image and the sixty enrolled images included in the enrollment DB 1740. To add the input image to the enrollment DB 1740, twenty score calculations are used. However, when one of the twenty enrolled images is replaced with the input image, nineteen score calculations are used since a score calculation with respect to the replaced enrolled image is excluded.

Figure 22:
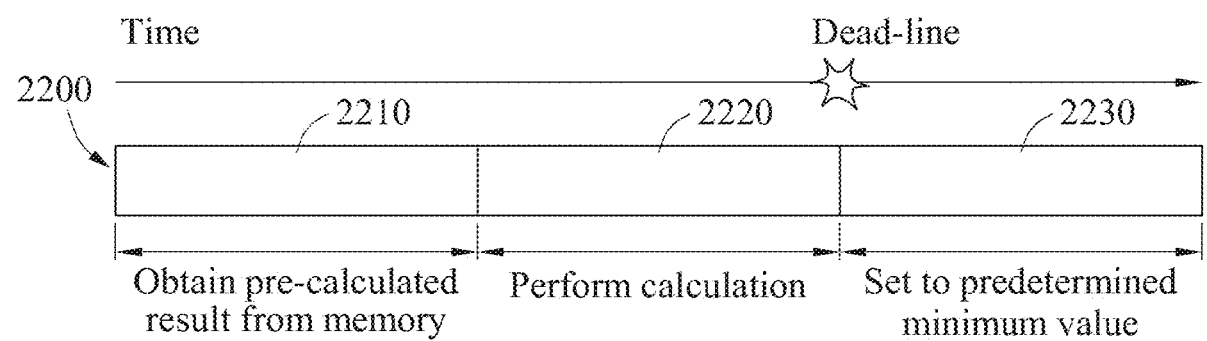

In this example, the update module 1720 utilizes the calculated results (previously with described with respect to FIGS. 18-20) stored in the memory 1750. Referring to FIG. 22, the update module 1720 determines a portion 2210 of the similarities by utilizing the calculated results stored in the memory 1750 to determine similarities 2000 between the input image and the twenty enrolled images corresponding to the accepted identifier.

A score calculation count for deciding whether the enrollment DB 1740 is to be updated by the update module 1720 corresponds to "20" or "19". When a score between the input image and an enrolled image is already calculated by the authentication module 1710 and the calculation result is stored in the memory 1750, the update module 1720 may reduce a computational complexity. For example, when a first similarity between the input image and a first enrolled image is already calculated by the first authenticator 1712, the update module 1720 obtains the first similarity from the memory 1750. The aforementioned operation may be referred to as a score reuse method.

The update module 1720 calculates similarities 2220 yet to be determined with best efforts based on the time estimated by the time estimation module 1730. For example, the first authenticator 1712 computes registration information. The registration information includes a translation vector and an angle of rotation through an image registration. The first authenticator 1712 calculates an overlap area ratio and an NCC value by rotating and translating an image.

When a similar overlap region is absent in the registration operation, the first authenticator 1712 omits a subsequent operation process and skips to a subsequent enrolled image. Through such an intermediate termination operation, an average authentication time decreases. However, a score with respect to the enrolled image for which the process is terminated intermediately is absent. In this example, the update module 1720 calculates the similarity directly. The update module 1720 calculates similarities within an allowed time limit, for example, within a maximum allowed time.

In a case in which a time is insufficient to calculate all of the similarities, the update module 1720 sets remaining similarities 2230 to be a predetermined and/or selected minimum value. The predetermined and/or selected minimum value may be a value less than the lower threshold illustrated in FIGS. 9A through 10. The aforementioned operation may be referred to as a selective score reuse method.

To calculate the similarities 2000 for the provided time, the update module 1720 processes the enrolled images in a random order or an order of indices of the enrolled images. The update module 1720 processes enrolled images selected as the first candidate group or the second candidate group with priority.

The operation of the first authenticator 1712 is described by an algorithm of Table 1 below.

TABLE 1

| Coarse search |
|---|
| A. Registration (Detect translation vector and angle of rotation) → When difficult to detect, skip corresponding image<br>B. Calculate score by assigning overlap area and NCC as weights<br>C. When score is greater than predetermined and/or selected level, declare acceptance and terminate authentication operation |

TABLE 1-continued

| Coarse search |
|---|
| D. If not last image and score is not greater than predetermined and/or selected level, repeat operations A to C on subsequent image<br>E. If last image, terminate |

The operation of the second authenticator 1713 is described by an algorithm of Table 2 below.

TABLE 2

| Fine search |
|---|
| A. Registration in block unit<br>B. Calculate block scores<br>C. When block scores are greater than or equal to predetermined and/or selected level, declare acceptance and terminate authentication operation<br>D. If not last image and block scores are not greater than or equal predetermined and/or selected level, repeat operations A to C on subsequent image<br>E. If last image, terminate |
| Block Scoring |
| A. Sort block scores calculated in fine search<br>B. Calculate average of top K scores<br>C. Decide whether to accept or reject by comparing average score to authentication threshold<br>D. Terminate |

The operation of the time estimation module 1730 is arranged by an algorithm of Table 3.

TABLE 3

| 1. Verify accepted stage and enrolled image being processed<br>2. Estimate time used for authentication based on time T1 used for unit processing in authentication stage 1, and time T2 used for unit processing in authentication stage 2<br>(For example, assuming that third operation results of authentication stage 2 are accepted by recognizer including M enrolled images, time of T1*M + T2*3 is used.)<br>3. Estimate number of reusable scores from first authenticator, and estimate time available for future operation based on maximum allowed time |
|---|

When one of the enrolled images is replaced with the input image, the operation of the update module 1720 is arranged by an algorithm of Table 4.

TABLE 4

| 1. When results calculated by authentication module are present, reuse<br>2. When results calculated by authentication module are absent, verify remaining time and calculate scores within allowed time<br>Estimate maximum score calculation allow count by verifying time estimated by time estimation module<br>Calculates scores by comparing maximum score calculation allow count to used score calculation count<br>3. When remaining time is insufficient, set scores for remaining images to be predetermined and/or selected minimum value, for example, 0.3<br>4. Repeat operations 1 to 3 on all image pairs excluding input image and replacement candidate<br>5. When maximum score decreases in response to replacement of candidate to be replaced with input image based on calculated scores, replace candidate to be replaced with input image, and update memory storing scores between enrolled images<br>6. Terminate |
|---|

Figure 23:
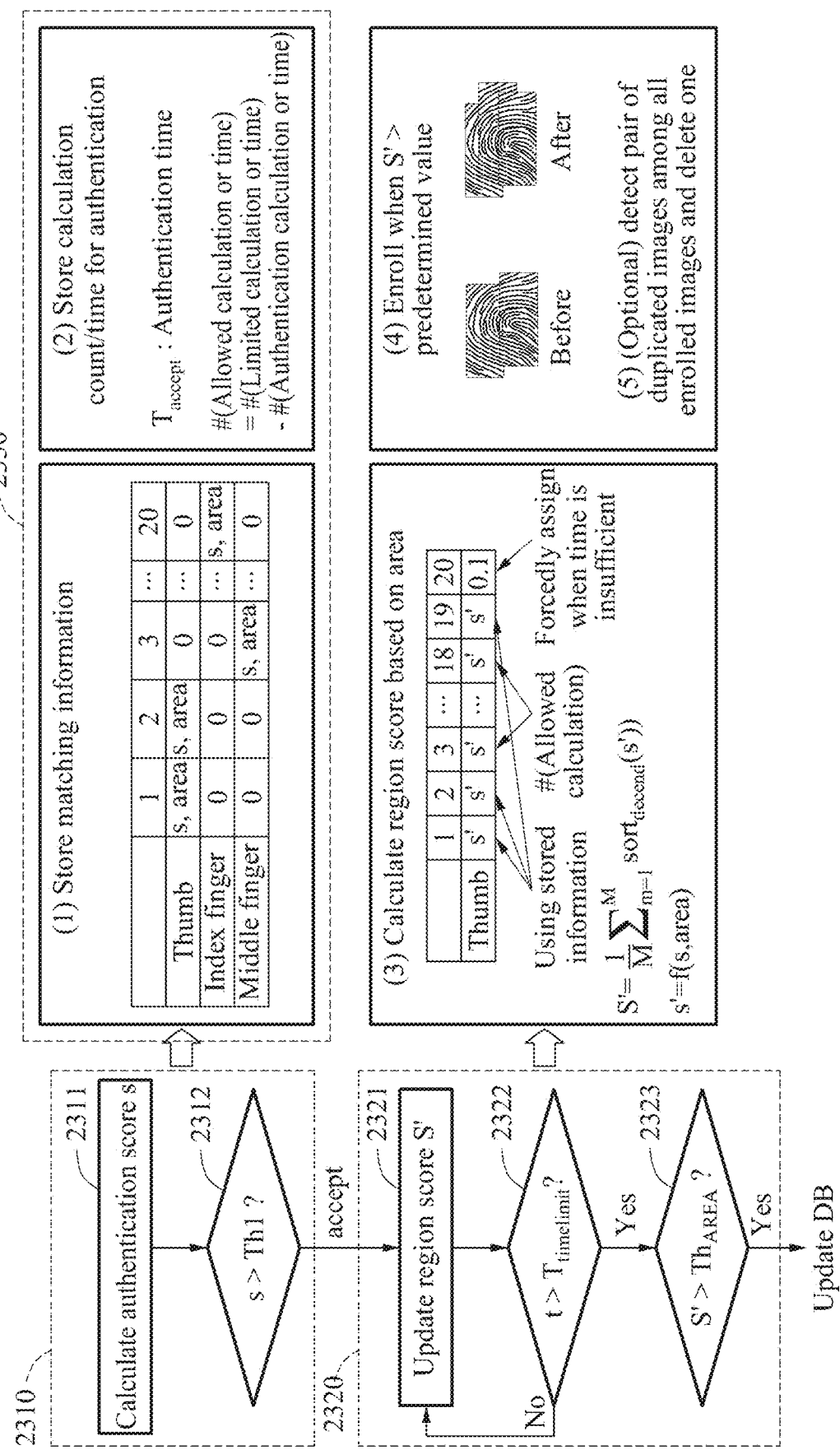

FIG. 23 is a flowchart illustrating an example embodiment of a method of adaptively updating an enrollment DB. Referring to FIG. 23, the updating apparatus calculates an authentication score s in a sub-operation 2311 of an authentication operation 2310. In response to verifying that the calculated authentication score s is greater than an authentication threshold Th1 in sub-operation 2312 of the authentication operation 2310, the updating apparatus accepts authentication. In response to the acceptance of the authentication, the updating apparatus stores results calculated for the authentication in a memory 2330 (non-transitory computer-readable storage media).

In sub-operations 2321 and 2322 of an update operation 2320, the updating apparatus updates a region score S' within a time limit. In sub-operation 2321, the updating apparatus determines individual region scores s' to be used to calculate the region score S'. In a case in which information is stored in the memory 2330, the individual region scores s' may be loaded from the memory 2330 by the updating apparatus. For example, individual region scores s' of a first enrolled image, a second enrolled image, and a nineteenth enrolled image corresponding to a thumb may be loaded from the memory 2330. In a case in which information is not stored in the memory 2330 for an enrolled image, the update apparatus determines an authentication score s and an overlap area and calculates the individual region score s' associated with the enrolled image based on the authentication score s and the overlap area. For example, individual region scores of third to eighteenth enrolled images corresponding to the thumb may be calculated by f(s, area). Here, f(s, area)=s×area may be satisfied.

In sub-operation 2322, the updating apparatus verifies whether a current time t is within $T_{timelimit}$. In response to verifying that the current time t is within $T_{timelimit}$, operation 2321 may be re-performed by the update apparatus to calculate an individual region score s' for a subsequent enrolled image and update the region score s'. Conversely, in response to verifying that the current time t exceeds $T_{timelimit}$, individual region scores s' yet to be calculated may be determined by the update apparatus to be a predetermined and/or selected value by the updating apparatus. For example, an individual region score of a twentieth enrolled image corresponding to the thumb may be set to be a predetermined and/or selected minimum value, for example, 0.1.

In sub-operation 2323, the updating apparatus verifies whether the region score S' is in a range between a first threshold $Th_{AREA\_1}$ and a second threshold $Th_{AREA\_2}$ which are predetermined and/or selected. The region score S' may be calculated by the update apparatus using Equation 5.

$$S' = \frac{1}{M}\sum_{m=1}^{M} sort_{decend}(s')) \quad \text{[Equation 5]}$$

In Equation 5, M denotes a predetermined and/or selected natural number, and $sort_{decend}(s')$ denotes a result of arranging individual region scores in a descending order. By Equation 5, the region score S' may be calculated by the updating apparatus to be an average of M individual region scores s' having high values.

When M is "1", the region score S' may correspond to a maximum similarity. In this example, sub-operation 2323 may correspond to operation 980 of FIG. 10.

In response to verifying that the region score S' is in the range between the first threshold $Th_{AREA\_1}$ and the second threshold $Th_{AREA\_2}$, an enrollment DB may be updated by the updating apparatus. For example, when the region score S' satisfies the condition of operation 2323, an enrolled image may be added to the enrollment DB.

For example, a number of enrolled images included in the enrollment DB may be changed in the following scenario.
1. When enrolling a user for the first time, eighteen images are enrolled in an enrollment DB.
2. In a process of using fingerprint authentication, up to twenty-five images are enrolled by adding new fingerprint images satisfying the update condition of the enrollment DB to the enrollment DB.
3. When up to twenty-five enrolled images are secured, twenty-five enrolled images are maintained by replacing an enrolled image with a new fingerprint image satisfying the update condition of the enrollment DB.

An operation of deleting an enrolled image from the enrollment DB to add a fingerprint image to the enrollment DB may be deactivated, or an operation of deleting an enrolled image from the enrollment DB to replace the enrolled image with a fingerprint image may be activated.

In sub-operation 2323, the first threshold $Th_{AREA\_1}$ may correspond to an upper threshold, and the second threshold $Th_{AREA\_2}$ may correspond to a lower threshold. Here, the upper threshold may be a score of a replacement candidate having most items of overlapping information, among enrolled images. Although not shown in the drawings, when adding a fingerprint image to the enrollment DB, the upper threshold may not be considered. In this example, in sub-operation 2323, the method may verify only whether the region score S' is greater than the lower threshold. In response to verifying that the region score S' is greater than the lower threshold, the corresponding fingerprint image may be added to the enrollment DB.

Figure 24:
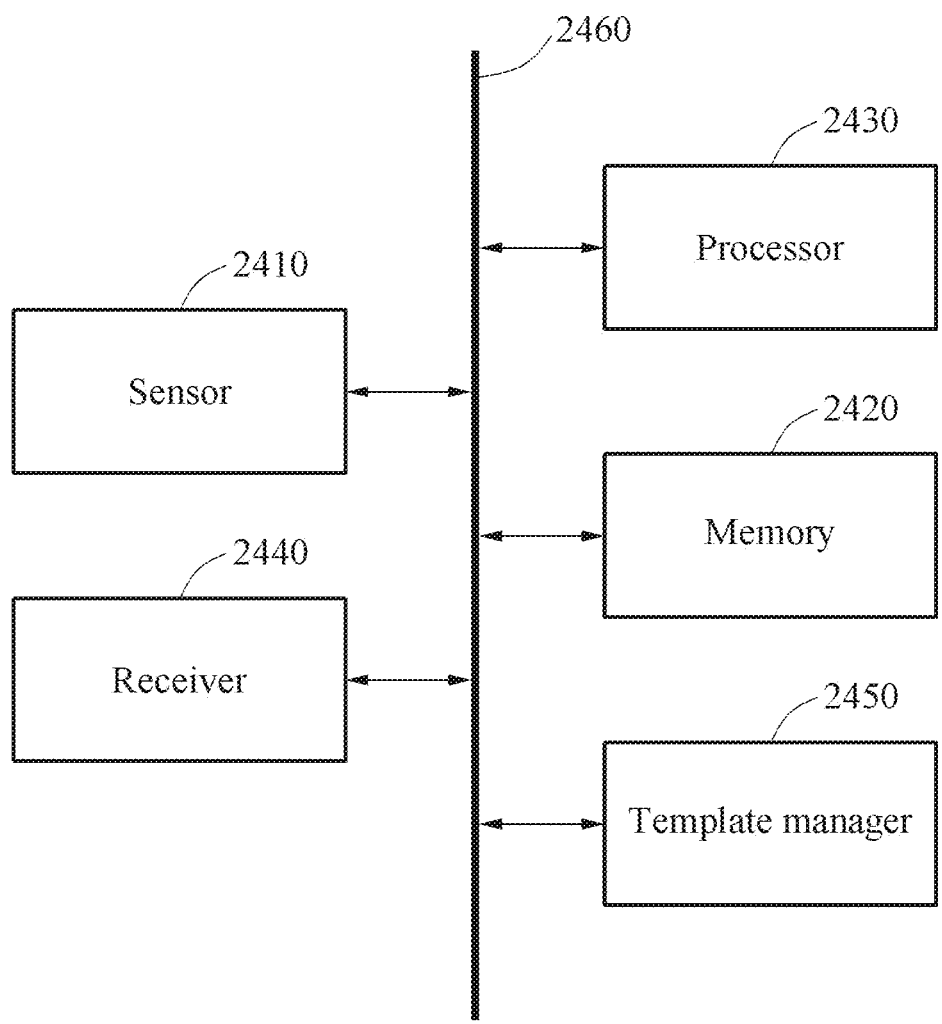

FIG. 24 is a block diagram illustrating an example embodiment of an updating apparatus for updating an enrollment DB.

Referring to FIG. 24, the updating apparatus includes a sensor 2410, a memory 2420 (non-transitory computer-readable storage media), a processor 2430, and a receiver 2440. The updating apparatus further includes a template manager 2450. The sensor 2410, the memory 2420, the processor 2430, the receiver 2440, and the template manager 2450 communicate with one another through a bus 2460.

The sensor 2410 may be the sensor 110 of FIG. 1. The sensor 2410 captures a fingerprint image using a well-known method, for example, a method of converting an optical image to an electric signal. The image is output through the receiver 2440 to the processor 2430. The processor 2430 is configured to perform the authentication operations and updating operations described in FIGS. 1-23 by executing instructions stored in the memory 2420.

In another example, the sensor 2410 may include a sensor configured to recognize a blood vessel pattern of a user. The sensor 2410 extracts a blood vessel pattern from skin on a back of a hand of the user. The sensor 2410 generates a brightness contrast of blood vessels with respect to the skin using an infrared lighting and a filter, and acquires an image including the blood vessel pattern. The processor 2430 updates the enrollment DB using the input image corresponding to the blood vessel pattern and enrolled images of the blood vessel pattern.

Figure 25:
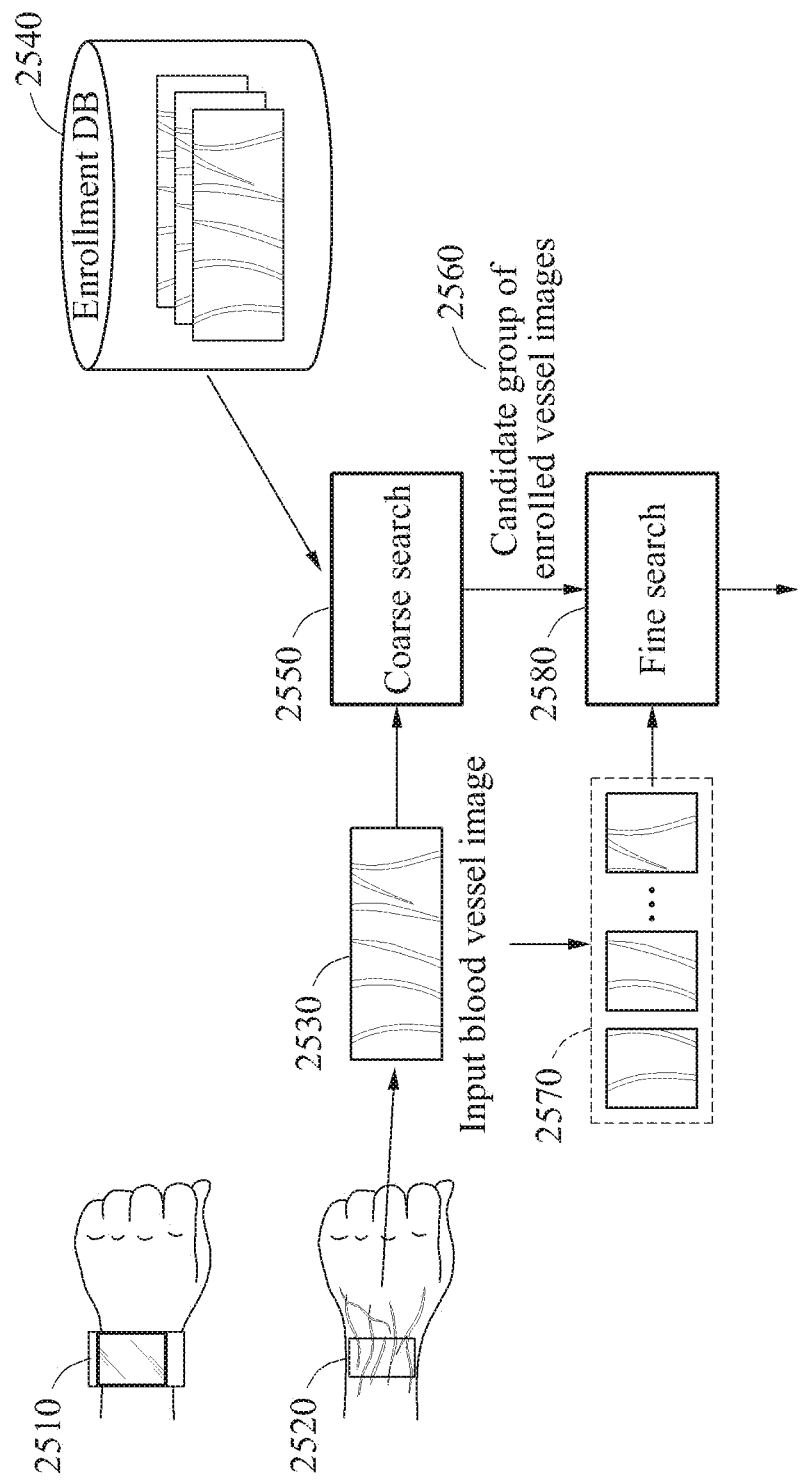

Referring to FIG. 25, the technique of authenticating a fingerprint pattern described with reference to FIGS. 1 through 23 is applied to a technique of authenticating a blood vessel pattern. For example, a smart watch 2510 of a user senses a blood vessel pattern 2520 of the user. An input image 2530 generated by sensing the blood vessel pattern 2520 of the user is authenticated through a coarse search 2550 and a fine search 2580. As a result of the coarse search 2550, a candidate group 2560 is extracted from enrolled images included in an enrollment DB 2540. The input image 2530 is divided into blocks 2750 for the fine search 2580.

In another example, the sensor 2410 may include a sensor configured to recognize an iris pattern of a user. The sensor 2410 scans or captures an iris pattern between a pupil and a sclera corresponding to a white region of an eye of the user. The processor 2430 updates the enrollment DB using an input image corresponding to the iris pattern and enrolled images of the iris pattern.

The memory 2420 stores the enrollment DB including the enrolled images. The memory 2420 stores the input image including biometric information captured by the sensor 2410, and a newly enrolled input image. The memory 2420 may be a volatile memory or a non-volatile memory.

The processor 2430 determines a maximum similarity based on sizes of overlap regions between the input image and the enrolled images. The processor 2430 enrolls the input image in the enrollment DB based on a result of comparing the maximum similarity to an upper threshold set based on sizes of overlap regions between the enrolled images. The processor 2430 calculates similarities between the input image and the enrolled images based on the sizes of the overlap regions between the input image and the enrolled images, and determine a similarity having a greatest value, among the similarities, to be the maximum similarity.

The processor 2430 calculates a correlation in an overlap region between the input image and one of the enrolled images, and calculates a size of the overlap region between the input image and the one enrolled image. The processor 2430 calculates a similarity between the input image and the one enrolled image based on the correlation and the size of the overlap region. In addition, the processor 2430 performs at least one of the methods described with reference to FIGS. 1 through 23.

The processor 2430 executes a program and controls the updating apparatus by executing program code. The program code executed by the processor 2430 is stored in the memory 2420. The updating apparatus is connected to an external device, for example, a personal computer or a network, through an input/output device (not shown), and exchanges data with the external device.

The receiver 2440 receives the input image including the biometric information sensed by the sensor 2410.

The template manager 2450 selects a replacement image from the enrolled images based on the similarities calculated based on the sizes of the overlap regions between the enrolled images. The template manager 2450 selects candidate images to be replaced from the enrolled images based on the similarities calculated based on the sizes of the overlap regions between the enrolled images. The template manager 2450 accumulates similarities between each of the candidate images and remaining enrolled images, and selects a candidate image with a highest cumulative similarity from the candidate images as the replacement image. The template manager 2450 may not be configured as a separate element as shown in FIG. 24, and the operation of the template manager 2450 is performed by the processor 2430 executing instructions stored on the memory 2420.

The updating apparatus may be included in various electronic systems, for example, mobile devices such as a mobile phone, a smart phone, a personal digital assistant (PDA), a tablet computer, and a laptop computer, computing devices such as a personal computer, a tablet computer, and a netbook computer, and electronic products such as a television, a smart television, and a security device for gate control.

The apparatuses, units, modules, devices, and other components illustrated in the drawings that perform the operations described herein are implemented by hardware components or hardware components executing software. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific example embodiments, it will be apparent to one of ordinary skill in the art that various changes in form and details may be made in these examples without departing from the spirit and scope of the claims and their equivalents. Example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for updating biometric authentication data in a database stored in a memory of a device, the method comprising:
   authenticating an input image including biometric information of a biometric feature of a user based on enrolled images in the database stored in the memory;
   identifying a portion of the input image that is not overlapped by any of the enrolled images;
   determining a first similarity based on sizes of overlap regions between the input image and enrolled images in the database, the first similarity having a greatest value of similarity of the sizes of the overlap regions between the input image and the enrolled images in the database, the determining the first similarity including,
      determining correlations in the overlap regions between the input image and the enrolled images,
      determining the sizes of the overlap regions between the input image and the enrolled images, and
   determining similarities between the input image and the enrolled images based on the correlations and the sizes of the overlap regions; and
   adding the input image to the database based on whether the first similarity is below an upper threshold, the upper threshold based on the sizes of overlap regions between the enrolled images.

2. The method of claim 1, wherein the authenticating, the determining and the adding are performed within a desired length of time.

3. The method of claim 2, wherein
   the authenticating includes authenticating the input image within a first length of timer; and
   the adding includes updating the database within a second length of time, the adding including,
      adapting the second length of time to be a difference between the desired length of time and the first length of time.

4. The method of claim 1, wherein the adding includes, replacing one of the enrolled images with the input image if the size of the portion is between the upper threshold and a lower threshold, the upper threshold selected to exclude outlier images from the database, and the lower threshold selected to increase a registration area of the biometric authentication data in the database stored in the memory.

5. The method of claim 4, wherein
   the upper threshold is associated with a minimum similarity; and
   the lower threshold is associated with a maximum similarity.

6. A non-transitory computer-readable storage medium storing instructions that, when executed by one or more processors, cause the one or more processors to perform the method of claim 1.

7. A method for updating biometric authentication data in an enrollment database (DB), the method comprising:
   receiving an input image including biometric information;
   determining a first similarity based on sizes of overlap regions between the input image and enrolled images in the enrollment DB, the first similarity having a greatest value of similarity of the sizes of the overlap regions between the input image and the enrolled images in the enrollment DB;
   determining whether to enroll the input image in the enrollment DB, based on whether the first similarity is below an upper threshold, the upper threshold based on the sizes of overlap regions between the enrolled images; and
   enrolling the input image based on the determination of whether to enroll the input image in the enrollment DB,
   wherein the determining the first similarity includes,
      determining correlations in the overlap regions between the input image and the enrolled images,
      determining the sizes of the overlap regions between the input image and the enrolled images, and
      determining similarities between the input image and the enrolled images based on the correlations and the sizes of the overlap regions.

8. The method of claim 7, wherein the enrolling of the input image comprises:
   on condition of determining to enroll the input image,
      determining whether to replace one of the enrolled images of the enrollment DB with the input image; and
   on condition of determining to replace the one of the enrolled images of the enrollment DB,
      selecting the one of the enrolled images of the enrollment DB as a replacement image, overlap regions of the replacement image with other enrolled images of the enrollment DB being larger than overlap regions of the input image with the other enrolled images of the enrollment DB, removing the replacement image from the enrollment DB, and enrolling the input image in the enrollment DB.

9. The method of claim 7, wherein the determining the similarities comprises:

determining a normalized cross correlation (NCC) value based on a translation vector and an angle of rotation, the translation vector and the angle of rotation based on an image registration between the input image and one of the enrolled images;

determining a sharing area ratio between the input image and the one enrolled image; and determining the first similarity of the similarities between the input image and the one enrolled image based on the NCC value and the sharing area ratio.

10. The method of claim 7, wherein the method further comprises:

selecting candidate images to be replaced from the enrolled images based on the first similarities, each of the candidate images associated with a portion of the first similarities, the portion including first similarities between a candidate image and the remaining enrolled image;

accumulating each portion; and selecting a candidate image having a highest accumulated portion from the candidate images as the replacement image.

11. The method of claim 7, wherein on condition of determining to enroll the input image, determining whether to replace one of the enrolled images, the determining whether to replace one of the enrolled images includes, determining whether the first similarity is greater than the upper threshold, and on condition of determining that the first similarity is greater than the upper threshold, maintaining the replacement image in the enrollment DB.

12. The method of claim 7, wherein the upper threshold includes a second similarity, the second similarity based on the sizes of the overlap regions between the enrolled images.

13. The method of claim 7, wherein the determining whether to enroll the input image includes, determining whether the first similarity exceeds a lower threshold; and on condition of determining that the first similarity exceeds the lower threshold, determining to enroll the input image in the enrollment DB.

14. The method of claim 13, wherein the determining whether the first similarity exceeds the lower threshold includes, determining whether the first similarity exceeds the lower threshold and is less than the upper threshold.

15. The method of claim 7, further comprising:

determining an authentication score between the input image and the enrolled images; and performing user authentication with respect to the input image based on the authentication score and an authentication threshold, the performing user authentication including the determining the similarities between the enrolled images and the input image.

16. The method of claim 7, wherein the biometric information comprises at least one of fingerprint information, blood vessel information, and iris information.

17. A non-transitory computer-readable storage medium storing instructions that, when executed by one or more processors, cause the one or more processors to perform the method of claim 7.

* * * * *